United States Patent
Ando et al.

(10) Patent No.: US 9,830,822 B2
(45) Date of Patent: Nov. 28, 2017

(54) DRIVING ASSISTANCE APPARATUS

(71) Applicant: DENSO CORPORATION, Kariya, Aichi-pref. (JP)

(72) Inventors: Motonori Ando, Kariya (JP); Junichiro Funabashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/346,583

(22) Filed: Nov. 8, 2016

(65) Prior Publication Data
US 2017/0132930 A1    May 11, 2017

(30) Foreign Application Priority Data

Nov. 11, 2015  (JP) ................ 2015-221534
Jul. 29, 2016   (JP) ................ 2016-149560

(51) Int. Cl.
  G08G 1/16      (2006.01)
  G08G 1/0967    (2006.01)
  G01C 21/32     (2006.01)
  G05D 1/02      (2006.01)
  B60W 30/095    (2012.01)
  G01C 21/36     (2006.01)

(52) U.S. Cl.
  CPC ........... G08G 1/161 (2013.01); B60W 30/095 (2013.01); G01C 21/3697 (2013.01); G08G 1/0967 (2013.01); G08G 1/163 (2013.01)

(58) Field of Classification Search
  CPC ...... G08G 1/161; G08G 1/0967; G08G 1/163; G01C 21/3697; B60W 30/095
  See application file for complete search history.

(56) References Cited

U.S. PATENT DOCUMENTS 7,295,925 B2 * 11/2007 Breed .................. B60N 2/2863
                                                340/436
8,466,807 B2 *  6/2013 Mudalige ............... G08G 1/163
                                                340/435

(Continued)

FOREIGN PATENT DOCUMENTS

JP   2006-182207 A   7/2006
JP   2008-097413 A   4/2008
JP   2013-134567 A   7/2013

Primary Examiner — Michael J Zanelli
(74) Attorney, Agent, or Firm — Knobbe, Martens, Olson & Bear, LLP

(57) ABSTRACT

A driving assistance apparatus in a subject vehicle includes a driving assistance section. A subject-vehicle estimated trajectory is estimated as a subsequent traveling trajectory from a current position and a traveling orientation of the subject vehicle. A neighboring-vehicle estimated trajectory is estimated as a subsequent traveling trajectory of a neighboring vehicle by acquiring trajectory estimation information. A determination area is designated to include a crossing point included in the subject-vehicle estimated trajectory and the neighboring-vehicle estimated trajectory. It is determined whether the determination area includes an intersection node in road map information. A first driving assistance level is used when the determination area does not include the intersection node; the first driving assistance level is smaller in driving assistance than a second driving assistance level used when the determination area includes the intersection node.

11 Claims, 16 Drawing Sheets

(56) References Cited

U.S. PATENT DOCUMENTS

| | | |
|---|---|---|
| 2002/0135467 A1 | 9/2002 | Koike |
| 2003/0006889 A1 | 1/2003 | Koike |
| 2003/0009275 A1 | 1/2003 | Koike |
| 2007/0282532 A1* | 12/2007 | Yamamoto .......... B60R 21/0134 701/301 |
| 2014/0327532 A1* | 11/2014 | Park ....................... G08G 1/161 340/435 |
| 2016/0071417 A1* | 3/2016 | Lewis .................... G08G 1/162 701/301 |
| 2017/0120926 A1* | 5/2017 | Yoon ..................... B60W 40/10 |

* cited by examiner

DRIVING ASSISTANCE APPARATUS

CROSS REFERENCE TO RELATED APPLICATION

The present application is based on Japanese Patent Application No. 2015-221534 filed on Nov. 11, 2015 and Japanese Patent Application No. 2016-149560 filed on Jul. 29, 2016, the disclosures of which are incorporated herein by reference.

TECHNICAL FIELD

The present disclosure relates to a driving assistance apparatus that assists a driver of a vehicle in driving. More specifically, the disclosure relates to an apparatus that estimates a possibility of collision between vehicles and provides driving assistance.

BACKGROUND ART

Patent literature 1: JP 2008-097413 A

There is known an apparatus that estimates a possibility of collision between vehicles and provides driving assistance. According to a technology described in patent literature 1, for example, a subject vehicle and a different vehicle communicate with each other. The subject vehicle is a host vehicle mounted with a driving assistance apparatus; the different vehicle is also a host vehicle mounted with a driving assistance apparatus. Based on road map information, the technology estimates future estimated vehicle positions of the subject vehicle and the different vehicle each mounted with the driving assistance apparatus. The technology compares the estimated vehicle position of the subject vehicle at a time in the future with the estimated vehicle position of the different vehicle at the time. As a result of the comparison, the estimated vehicle position of the subject vehicle may be near to the estimated vehicle position of the different vehicle. In this case, the technology determines that the subject vehicle is likely to collide with the different vehicle and provides safety support information.

According to the technology in patent literature 1, the subject vehicle needs to always estimate its position on a road represented by the road map information. In addition, the different vehicle (hereinafter referred to as a neighboring vehicle) in the vicinity of the subject vehicle also needs to always estimate its position on a road represented by the road map information. The driving assistance apparatus mounted on the subject vehicle and the driving assistance apparatus mounted on the neighboring vehicle each need to include a map matching function. The technology needs to always perform a map matching process, increasing a calculation load. The driving assistance apparatus mounted on the subject vehicle requires a large amount of calculation if the driving assistance apparatus mounted on the subject vehicle successively acquires the current position of the neighboring vehicle and also determines the current position of the neighboring vehicle by performing the map matching process.

It is an object of the disclosure to provide a driving assistance apparatus that determines whether vehicles highly likely to collide with each other, by using a small amount of calculation in order to perform driving assistance.

To achieve the above object, according to an example of the disclosure, a driving assistance apparatus is provided with a driving assistance section and the following sections. A subject vehicle position determination section is included to successively acquire a position determined by receiving a navigation signal transmitted from a navigation satellite included in a satellite navigation system and successively determine a current position of the vehicle, the vehicle being referred to as a subject vehicle. A subject vehicle estimation section is included to estimate a subject-vehicle estimated trajectory as a subsequent traveling trajectory of the subject vehicle from a current position of the subject vehicle determined by the subject vehicle position determination section and a traveling orientation of the subject vehicle. A neighboring vehicle estimation section is included to estimate a neighboring-vehicle estimated trajectory as a subsequent traveling trajectory of a neighboring vehicle around the subject vehicle by acquiring trajectory estimation information to estimate a neighboring-vehicle estimated trajectory as a subsequent traveling trajectory of the neighboring vehicle via an inter-vehicle communication unit included in the subject vehicle, the trajectory estimation information including a traveling orientation of the neighboring vehicle and a current position of the neighboring vehicle determined based on the navigation signal. An area designation section is included to designate a determination area so as to include a crossing point that is included in the subject-vehicle estimated trajectory and the neighboring-vehicle estimated trajectory. A determination section is included to determine whether the determination area designated by the area designation section includes an intersection node in road map information that represents an intersection of roads as the intersection node. The driving assistance section uses a first driving assistance level when the determination area does not include the intersection node, the first driving assistance level being smaller in driving assistance than a second driving assistance level used when the determination area includes the intersection node.

This configuration estimates the subject-vehicle estimated trajectory as a subsequent traveling trajectory for the subject vehicle and the neighboring-vehicle estimated trajectory as a subsequent traveling trajectory for the neighboring vehicle. The determination area is designated so as to include a crossing point if included in the subject-vehicle estimated trajectory and the neighboring-vehicle estimated trajectory. The determination area is used to determine whether the crossing point is included in an intersection of roads. The determination section determines whether the determination area includes the intersection node.

The subject vehicle and the neighboring vehicle are estimated to pass through the same intersection of roads when the determination area includes the intersection node. The subject vehicle and the neighboring vehicle are estimated not to pass through the same intersection of roads when the determination area does not include the intersection node.

Vehicles typically collide with each other at an intersection of roads. Namely, the subject vehicle and the neighboring vehicle are unlikely to collide when a crossing point is not included in the intersection of roads even if there is a crossing point between the subject-vehicle estimated trajectory and the neighboring-vehicle estimated trajectory. Namely, determining whether the determination area includes an intersection node signifies determining whether the subject vehicle and the neighboring vehicle are likely to collide.

The intersection of roads is highly unlikely to include the crossing point when the determination area contains no intersection node. The subject vehicle and the neighboring vehicle are unlikely to collide when the intersection of roads contains no crossing point. An assistance level determination section uses a driving assistance level to reduce or suppress driving assistance when the determination area includes no intersection node rather than when the determination area includes the intersection node.

The configuration can determine whether a collision is highly likely to occur, by using a small amount of calculation because no map matching process is performed to determine a current position of the neighboring vehicle.

BRIEF DESCRIPTION OF DRAWINGS

The above and other objects, features, and advantages of the present disclosure will become more apparent from the following detailed description made with reference to the accompanying drawings. In the drawings.

DESCRIPTION OF EMBODIMENTS

Figure 1:
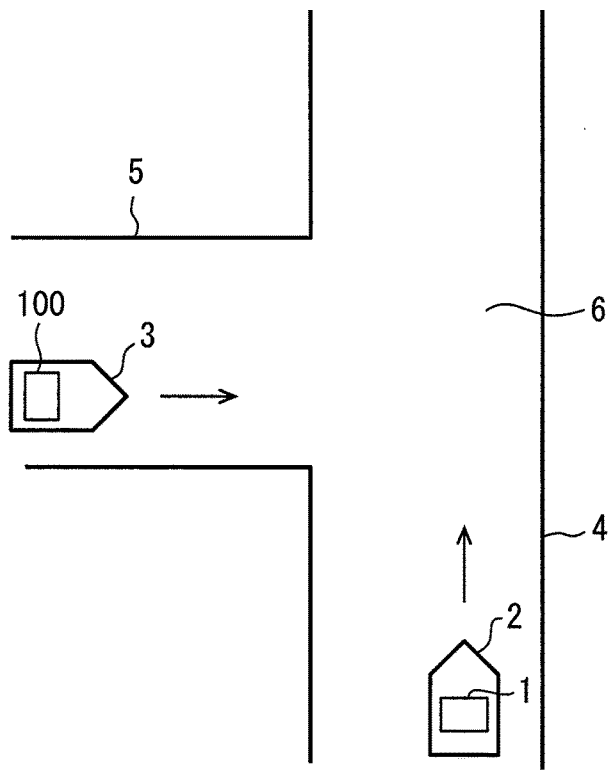
FIG. 1 is a diagram illustrating a state in which a vehicle mounted with a driving assistance system travels.

Embodiments of the present disclosure will be described with reference to the accompanying drawings. As in FIG. 1, a subject vehicle 2 is a host vehicle mounted with a driving assistance system 1 and travels a road 4. A neighboring vehicle 3 (also referred to as a different vehicle) exists near the subject vehicle 2. The neighboring vehicle 3 is a host vehicle mounted with a driving assistance system 100. The neighboring vehicle 3 travels a road 5 toward an intersection of roads 6. The road 5 intersects with the road 4 the subject vehicle 2 travels. The intersection of roads may be also referred to as a traffic intersection, or an intersection.

The driving assistance system 100 cyclically transmits neighboring vehicle information, namely, information about the neighboring vehicle 3, around the neighboring vehicle 3 using a technique that enables a short-range wireless communication unit 12 included in the driving assistance system 1 to receive the neighboring vehicle information. The transmission cycle is 200 milliseconds, for example. The neighboring vehicle information belongs to the same type of information as subject vehicle information to be described later. The driving assistance system 100 is configured similarly to the driving assistance system 1. The configuration of the driving assistance system 1 will be described first. Then, the configuration of the driving assistance system 100 will be described. Note that information may be used as being countable as well as uncountable. That is, information may be equivalent to an information item; informations may be equivalent to information items.

[Configuration of the Driving Assistance System 1]

Figure 2:
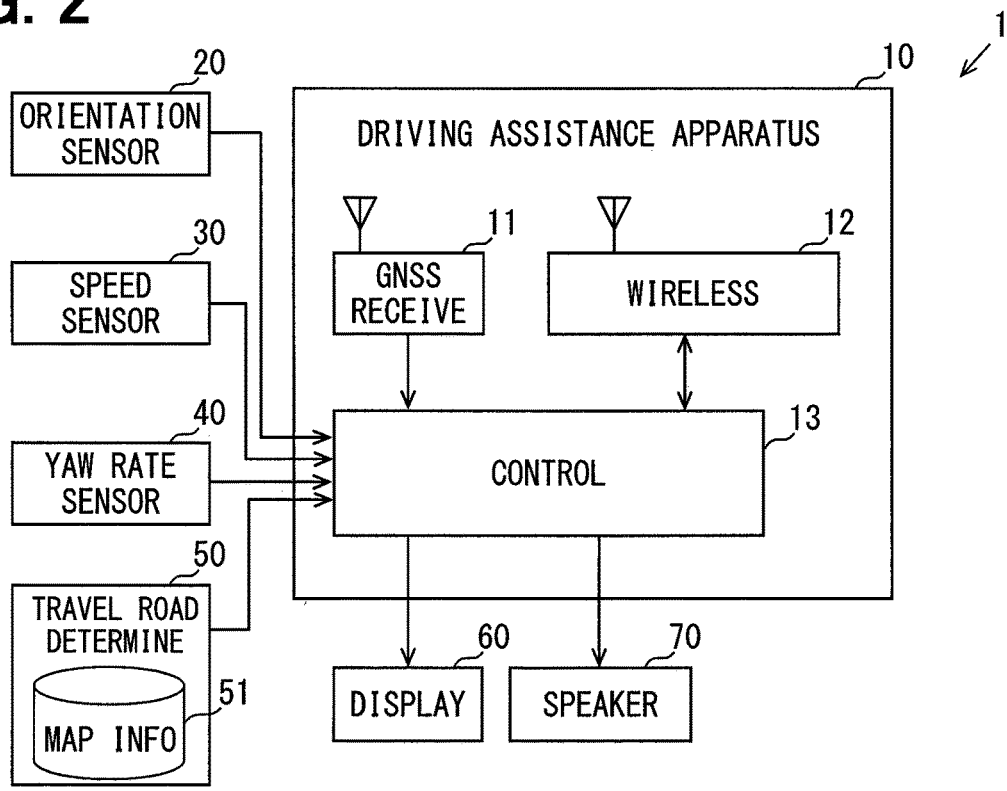
FIG. 2 is a block diagram illustrating a configuration of the driving assistance system.

As in FIG. 2, the driving assistance system 1 includes a driving assistance apparatus 10, an orientation sensor 20, a vehicle speed sensor 30, a yaw rate sensor 40, a traveling road determination apparatus 50, a display apparatus 60, and a speaker 70.

The driving assistance apparatus 10 includes a GNSS reception unit 11, the short-range wireless communication unit 12, and a controller 13. The GNSS reception unit 11 receives a navigation signal transmitted from a navigation satellite included in GNSS (Global Navigation Satellite System) as a satellite navigation system. The GNSS reception unit 11 successively calculates a current position based on the received navigation signal.

The short-range wireless communication unit 12 performs inter-vehicle communication and road-to-vehicle communication. The short-range wireless communication unit 12 uses a radio wave of a specified frequency band such as 5.9 GHz band or 700 MHz band to communicate with a short-range wireless communication apparatus mounted on another vehicle and a roadside apparatus installed at the roadside. The short-range wireless communication unit 12 is capable of the inter-vehicle communication and corresponds to an inter-vehicle communication unit.

The controller 13, which may be also referred to as an electronic control unit or circuit, is provided as a computer including a CPU, ROM, and RAM. The CPU performs a process in FIG. 3 by executing a program stored in a non-transitory tangible storage medium such as the ROM while using a temporary storage function of the RAM. Performing the process in FIG. 3 performs a method corresponding to the program.

Figure 3:
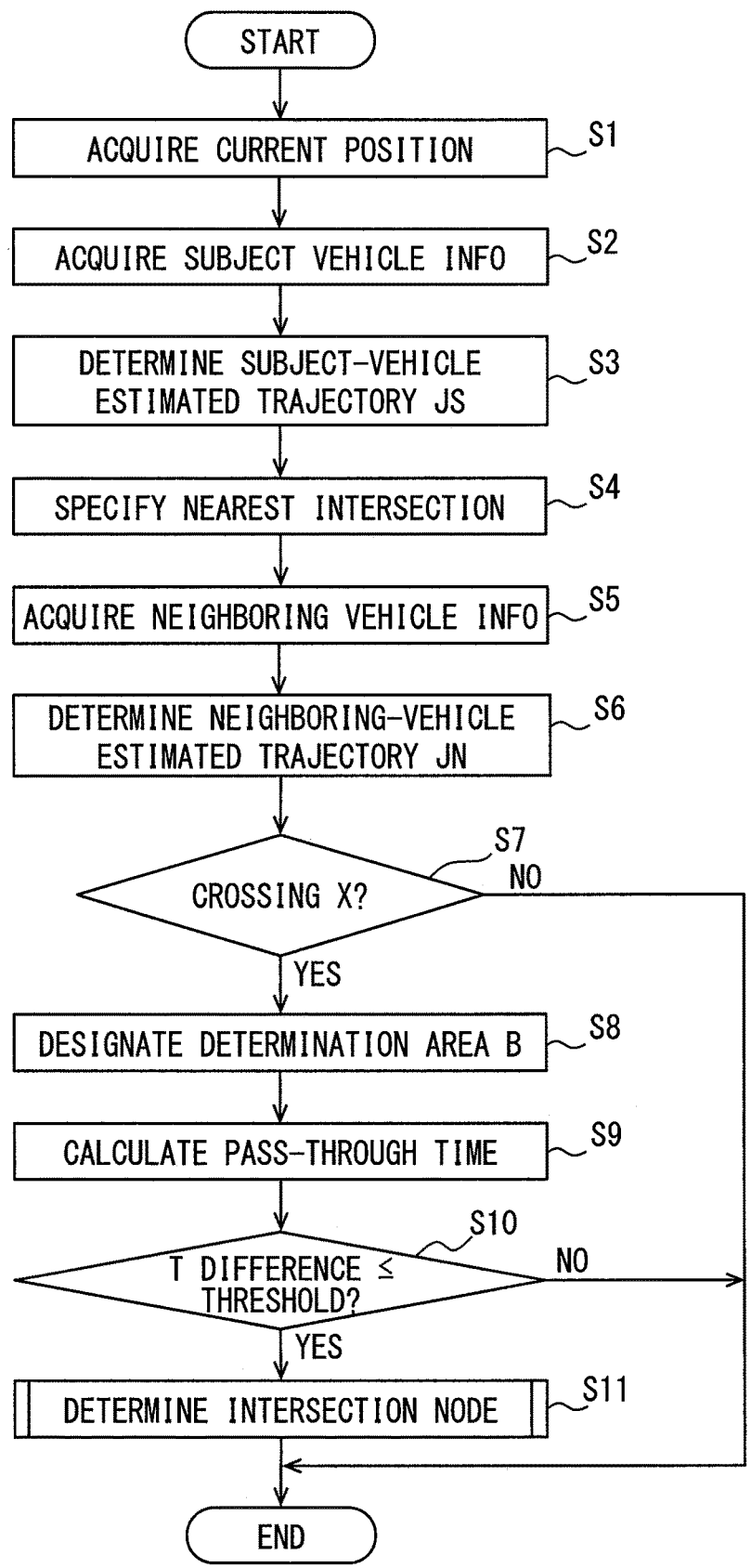
FIG. 3 is a flowchart illustrating a process performed by a controller in FIG. 2.

In addition to the process in FIG. 3, the controller 13 cyclically transmits subject vehicle information (to be described) around the subject vehicle 2 via the short-range wireless communication unit 12. The transmission cycle is 200 milliseconds similar to that of the neighboring vehicle information, for example.

The orientation sensor 20 detects an absolute orientation of the subject vehicle 2. The orientation sensor 20 uses a geomagnetic sensor, for example. The vehicle speed sensor 30 successively detects a vehicle speed of the subject vehicle 2. The yaw rate sensor 40 detects a yaw rate, namely, an angular velocity of rotation that passes through the yaw rate sensor 40 and is generated around a vertical shaft of the subject vehicle 2.

The traveling road determination apparatus 50 includes a storage unit to store the road map information and a current position detection section (unshown). The traveling road determination apparatus 50 successively specifies a road the subject vehicle 2 travels. The road map information stored in the storage unit 51 represents a road using node information and link information. The node information relates to a node. The node denotes a point to represent a road. The node includes an intersection of roads. The node to represent an intersection of roads is hereinafter referred to as an intersection node. The link information relates to a link that connects nodes with each other. The link information about some roads includes lane count information that provides the number of lanes (i.e., a lane count).

The display apparatus 60 is placed at a position that enables the display apparatus 60 to be seen from a driver's seat of the subject vehicle 2. The display apparatus 60 displays information for a driver of the subject vehicle 2. The information to be displayed assists the driver in driving of the subject vehicle 2 and includes the existence of a nearby vehicle to which attention needs to be paid. The speaker 70 generates various sounds in a vehicle compartment of the subject vehicle 2.

[Configuration of the Driving Assistance System 100]

The driving assistance system 100 successively transmits a set of neighboring vehicle information. The neighboring vehicle information includes a current position of the neighboring vehicle 3, an absolute orientation, a vehicle speed, a yaw rate, and a vehicle ID. The current position of the neighboring vehicle 3 is determined based on a navigation signal similarly to the current position of the subject vehicle 2.

The driving assistance system 100 includes the GNSS reception unit 11, the orientation sensor 20, the vehicle speed sensor 30, the yaw rate sensor 40, the short-range wireless communication unit 12, and the controller in FIG. 2. The controller acquires the neighboring vehicle information and allows the short-range wireless communication unit 12 to transmit the neighboring vehicle information. If these components are included, the driving assistance system 100 can be configured equally to the driving assistance system 1 in terms of hardware and software, namely, a process of the controller 13 described next.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device or module. Furthermore, such a section along with a structural modifier may be also referred as another name; for instance, a subject vehicle estimation section may be also referred to as a subject vehicle estimator. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

[Process Performed by the Controller 13]

The controller 13 cyclically performs the process in FIG. 3. At S1, the controller 13 acquires a current position of the subject vehicle 2 from the GNSS reception unit 11. The current position is represented by latitude, longitude, and altitude. The process at S1 enables the controller 13 to determine the current position of the subject vehicle 2. Therefore, S1 corresponds to a subject vehicle position determination section or a subject vehicle position determiner.

At S2, the controller 13 acquires the subject vehicle information except the current position. Specifically, the subject vehicle information except the current position includes an absolute orientation, a vehicle speed, and a yaw rate of the subject vehicle 2. The absolute orientation, the vehicle speed, and the yaw rate are acquired from the orientation sensor 20, the vehicle speed sensor 30, and the yaw rate sensor 40, respectively.

At S3, the controller 13 determines subject-vehicle estimated trajectory JS. Subject-vehicle estimated trajectory JS provides a trajectory the subject vehicle 2 is estimated to travel afterwards. Subject-vehicle estimated trajectory is according to the embodiment is represented as a straight line that extends from the current position acquired at S1 as a basing point along the absolute orientation acquired at S2. Subject-vehicle estimated trajectory JS according to the embodiment is represented as a straight line extending along the absolute orientation acquired at S2 and therefore uses the absolute orientation acquired at S2 as a traveling direction of the subject vehicle 2. S3 corresponds to a subject vehicle estimation section or a subject vehicle estimator.

At S4, the controller 13 specifies the nearest intersection of roads ahead in the traveling direction of the subject vehicle 2 on the road 4 the subject vehicle 2 travels. Specifically, this process acquires the road map information near the subject vehicle determined based on the current position of the subject vehicle 2 acquired at S1 while the road map information is acquired from the traveling road determination apparatus 50. The controller 13 performs map matching based on the acquired road map information and the current position of the subject vehicle 2 successively acquired at S1. The controller 13 thereby specifies the road the subject vehicle 2 travels. The controller 13 further specifies the nearest intersection of roads ahead in the traveling direction of the subject vehicle 2 on the specified road. The controller 13 uses the map matching in order to specify the nearest intersection of roads. Note that in the process to follow, the controller 13 does not use the map matching to correct the current position of the subject vehicle 2 acquired from the GNSS reception unit 11. This aims at preventing the amount of calculation from increasing.

At S5, the controller 13 acquires the neighboring vehicle information via the short-range wireless communication unit 12. As above, the neighboring vehicle 3 successively transmits the neighboring vehicle information. The short-range wireless communication unit 12 can receive the neighboring vehicle information transmitted by the driving assistance system 100 if the neighboring vehicle 3 exists in a communication range for the short-range wireless communication unit 12 of the subject vehicle 2. The controller 13 can acquire the neighboring vehicle information at S5 if the short-range wireless communication unit 12 can receive the neighboring vehicle information. As above, the neighboring vehicle information includes the current position, the absolute orientation, the vehicle speed, and the yaw rate of the neighboring vehicle 3. The current position of the neighboring vehicle 3 is determined based on a navigation signal similarly to the current position of the subject vehicle 2.

The controller 13 may acquire the neighboring vehicle information from each of the several neighboring vehicles 3.

The controller 13 performs S6 and later on each neighboring vehicle 3 if the neighboring vehicle information is successfully acquired from the neighboring vehicles 3.

At S6, the controller 13 determines neighboring-vehicle estimated trajectory JN as a trajectory the neighboring vehicle 3 is estimated to travel afterwards. Neighboring-vehicle estimated trajectory JN according to the embodiment is represented as a straight line that extends from the current position acquired at S5 as a basing point along the absolute orientation acquired at S5. S6 corresponds to a neighboring vehicle estimation section or a neighboring vehicle estimator. The current position and the absolute orientation acquired at S5 are used to determine neighboring-vehicle estimated trajectory JN and correspond to trajectory estimation information.

At S7, the controller 13 determines whether crossing point X is included in subject-vehicle estimated trajectory JS determined at S3 and neighboring-vehicle estimated trajectory JN determined at S6. The controller 13 terminates the process in FIG. 3 when determining that crossing point X is not included. The controller 13 proceeds to S8 when determining that crossing point X is included.

Figure 4:
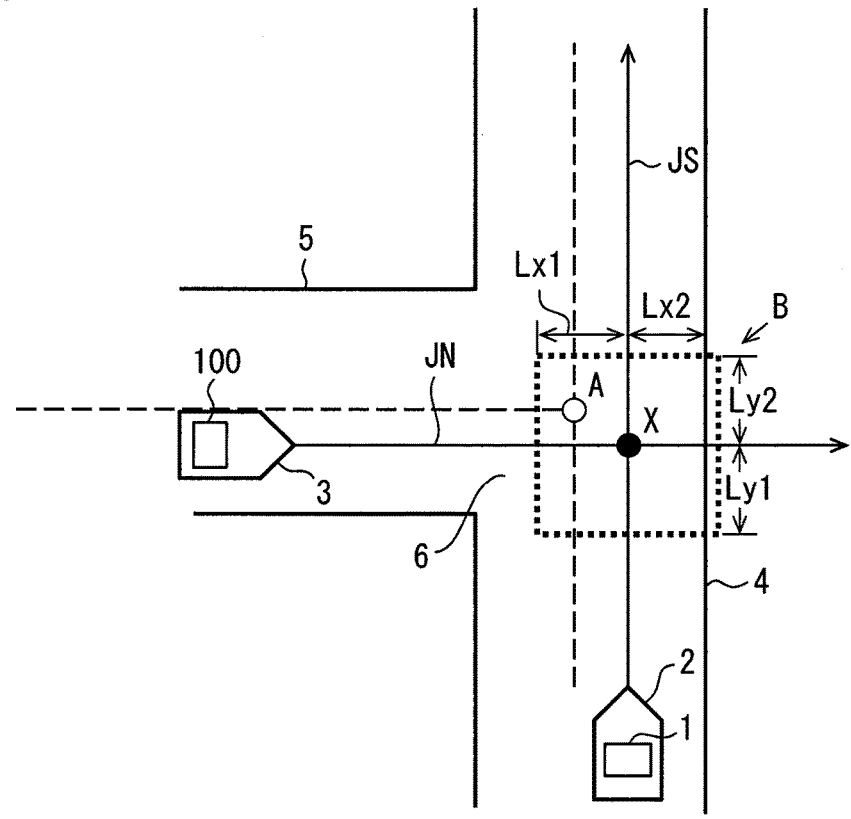
FIG. 4 is a diagram illustrating determination area B set up in a first embodiment.

At S8, the controller 13 sets up or designates determination area B. S8 corresponds to an area designation section or an area designator. As in FIG. 4, determination area B according to the embodiment is a parallelogram that uses crossing point X as the center of determination area B. Determination area B contains a pair of sides parallel to subject-vehicle estimated trajectory JS and a pair of sides perpendicular to subject-vehicle estimated trajectory JS. As in FIG. 4, lengths Ly1 and Ly2 settle the length of the side parallel to subject-vehicle estimated trajectory JS of determination area B. Length Ly1 belongs to part of the side nearer to the subject vehicle 2 with reference to crossing point X. Length Ly2 belongs to part of the side farther from the subject vehicle 2 with reference to crossing point X. Lengths Lx1 and Lx2 settle the length of the side perpendicular to subject-vehicle estimated trajectory JS. Length Lx1 belongs to part of the side at the left viewed from the subject vehicle 2 with reference to subject-vehicle estimated trajectory JS. Length Lx2 belongs to part of the side at the right viewed from the subject vehicle 2 with reference to subject-vehicle estimated trajectory JS.

Lengths Ly1, Ly2, Lx1, and Lx2 can be designated or set up individually. Therefore, determination area B may be a rectangle. If possible, determination area B is not excessively larger than the intersection of roads 6. This is because determination area B is used to determine whether the intersection of roads contains crossing point X by determining whether determination area B contains intersection node A.

The embodiment prescribes the length of the side perpendicular to subject-vehicle estimated trajectory JS in determination area B to be five or six meters, for example. This length is slightly shorter than or equal to the width of a road that has no lanes but is capable of driving facing traffic. According to the embodiment, the length of a pair of sides parallel to subject-vehicle estimated trajectory JS equals the length of a pair of sides perpendicular to subject-vehicle estimated trajectory JS.

At S9, the controller 13 calculates pass-through time required for the subject vehicle 2 to pass through crossing point X and pass-through time required for the neighboring vehicle 3 to pass through crossing point X. To calculate the pass-through time for the subject vehicle 2, the controller 13 calculates a distance from the current position of the subject vehicle 2 to crossing point X based on the current position of the subject vehicle 2 and coordinates of crossing point X. The controller 13 divides the distance by a current vehicle speed of the subject vehicle 2 to calculate the pass-through time for the subject vehicle 2. The controller 13 calculates the pass-through time for the neighboring vehicle 3 similarly to the pass-through time for the subject vehicle 2.

At S10, the controller 13 determines whether a time difference between the pass-through time for the subject vehicle 2 and the pass-through time for the neighboring vehicle 3 is smaller than or equal to a predetermined threshold value. The threshold value is used to determine a possibility of collision when the subject vehicle 2 and the neighboring vehicle 3 pass through crossing point X. The threshold value is set to several seconds, for example. The controller 13 terminates the process in FIG. 3 if the determination at S10 results in NO. The controller 13 proceeds to S11 if the determination at S10 results in YES.

Figure 5:
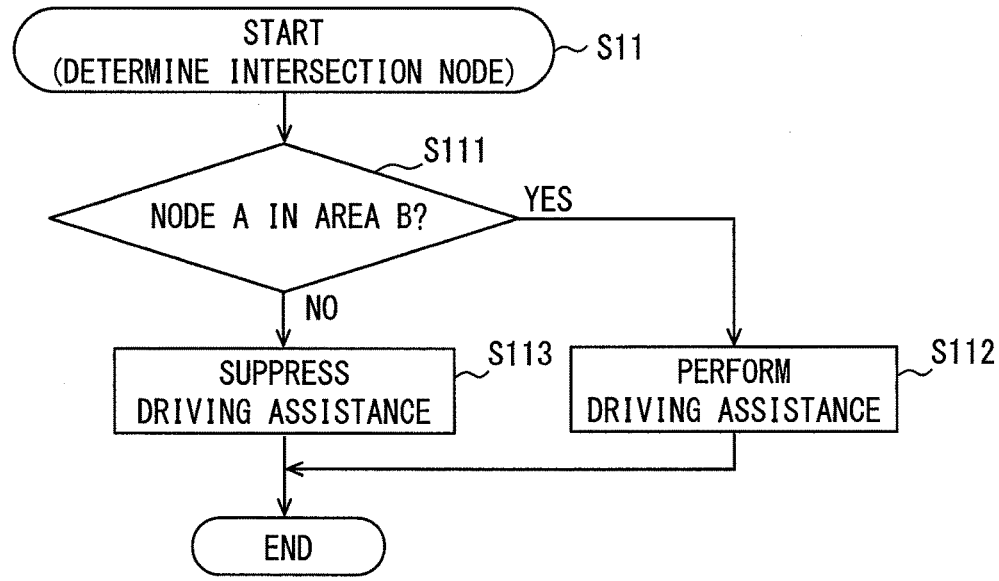
FIG. 5 is a flowchart illustrating a detailed process at S11 in FIG. 3.

At S11, the controller 13 performs an intersection node determination process. FIG. 5 illustrates this process specifically. The process at S111 corresponds to a determination section or an intersection determiner. At S111, the controller 13 determines whether determination area B contains intersection node A in the road map information. The controller 13 proceeds to S112 if the determination at S111 results in YES. S112 and S113 each correspond to a driving assistance section, a driving assistance processor, or a driving assistant.

At S112, the controller 13 performs driving assistance. Specifically, the driving assistance here allows the display apparatus 60 to display a possibility of collision with the neighboring vehicle 3 and allows the speaker 70 to generate a sound that notifies the existence of the neighboring vehicle 3. Several driving assistance levels are available.

For example, suppose that there are four driving assistance levels. Highest driving assistance level lv4 allows the display apparatus 60 to display an image signifying warning and allows the speaker 70 to generate a sound signifying warning. Driving assistance level lv3 allows the display apparatus 60 to display an image signifying caution. In addition, the speaker 70 may generate a sound signifying caution. Driving assistance level lv2 allows the display apparatus 60 to display an image signifying that the neighboring vehicle 3 is detected. Driving assistance level lv1 performs no driving assistance. The number of driving assistance levels and the contents of the driving assistance performed by the driving assistance levels are not limited to those described above.

At S112, the controller 13 performs driving assistance level lv4 or driving assistance level lv3. Selection of driving assistance level lv4 or driving assistance level lv3 depends on whether the subject vehicle 2 can stop before crossing point X when a driver of the subject vehicle 2 fully depresses a brake pedal. The controller 13 performs driving assistance level lv4 if the subject vehicle 2 cannot stop before crossing point X when the driver of the subject vehicle 2 fully depresses the brake pedal. The controller 13 performs driving assistance level lv3 if the subject vehicle 2 can stop before crossing point X.

There is provided a predetermined calculating formula that represents the relation between a mileage and a decrease in speed of the subject vehicle 2 when the driver of the subject vehicle 2 fully depresses the brake pedal. The controller 13 uses the calculating formula to determine whether the subject vehicle 2 can stop before crossing point X when the driver of the subject vehicle 2 fully depresses the brake pedal.

The controller 13 proceeds to S113 if the determination at S111 results in NO. At S113, the controller 13 selects a driving assistance level lower than the driving assistance level determined at S112, if performed, and performs the driving assistance corresponding to the determined driving assistance level.

As above, the controller 13 performs driving assistance level lv4 or driving assistance level lv3 at S112. According to the embodiment, however, the controller 13 performs the driving assistance at S113 using the driving assistance level lower than S112 by two. Therefore, the controller 13 performs the driving assistance using driving assistance level lv2 or driving assistance level lv1 at S113. The controller 13 disables (i.e., does not perform) the driving assistance when driving assistance level lv1 is selected.

The controller 13 performs S113 if the determination at Sill results in NO. Determination area B does not contain intersection node A when S113 is performed. The intersection of roads is highly unlikely to contain crossing point X. Generally, vehicles collide with each other in an intersection of roads. When S113 is performed, the subject vehicle 2 and the neighboring vehicle 3 are less likely to collide even if the time difference at S10 is smaller than or equal to the threshold value. For this reason, at S113, the controller 13 selects the driving assistance level lower or smaller, in driver assistance or driver assistance degree, than the driving assistance level determined at S112 when performed.

Determining the intersection node concerning the several neighboring vehicles 3 results in selecting several driving assistance levels. In this case, the controller 13 performs the highest one of the selected driving assistance levels.

[Suppressing the Driving Assistance]

Figure 6:
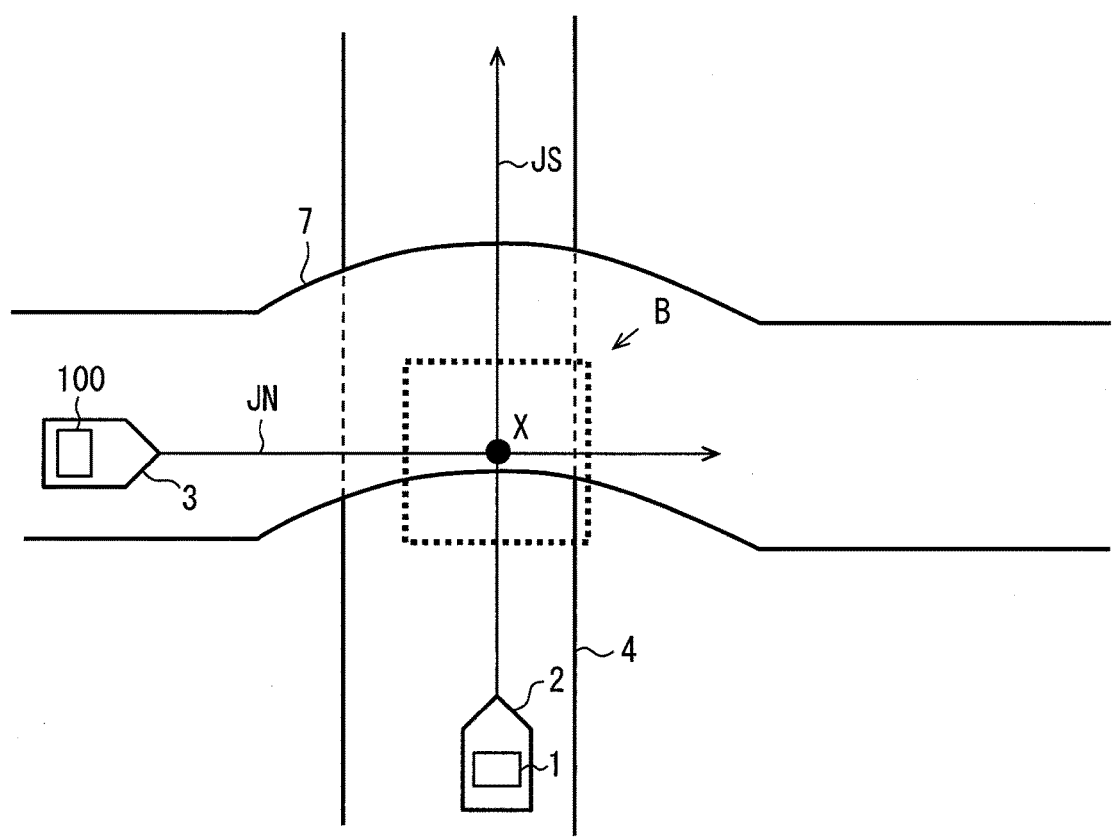
FIG. 6 is a diagram illustrating an example of suppressing driving assistance.

The description below explains an example of suppressing or disabling the driving assistance. As in FIG. 6, there is no possibility of collision between the subject vehicle 2 and the neighboring vehicle 3 when the neighboring vehicle 3 travels a road 7 that provides grade separation for the road 4 the subject vehicle 2 travels. As in FIG. 6, determination area B does not contain intersection node A. In this case, the driving assistance is disabled even though there is crossing point X between subject-vehicle estimated trajectory JS and neighboring-vehicle estimated trajectory JN and a time difference between the pass-through time required for the subject vehicle 2 to pass through crossing point X and the pass-through time required for the neighboring vehicle 3 to pass through crossing point X is smaller than or equal to the threshold value.

Figure 7:
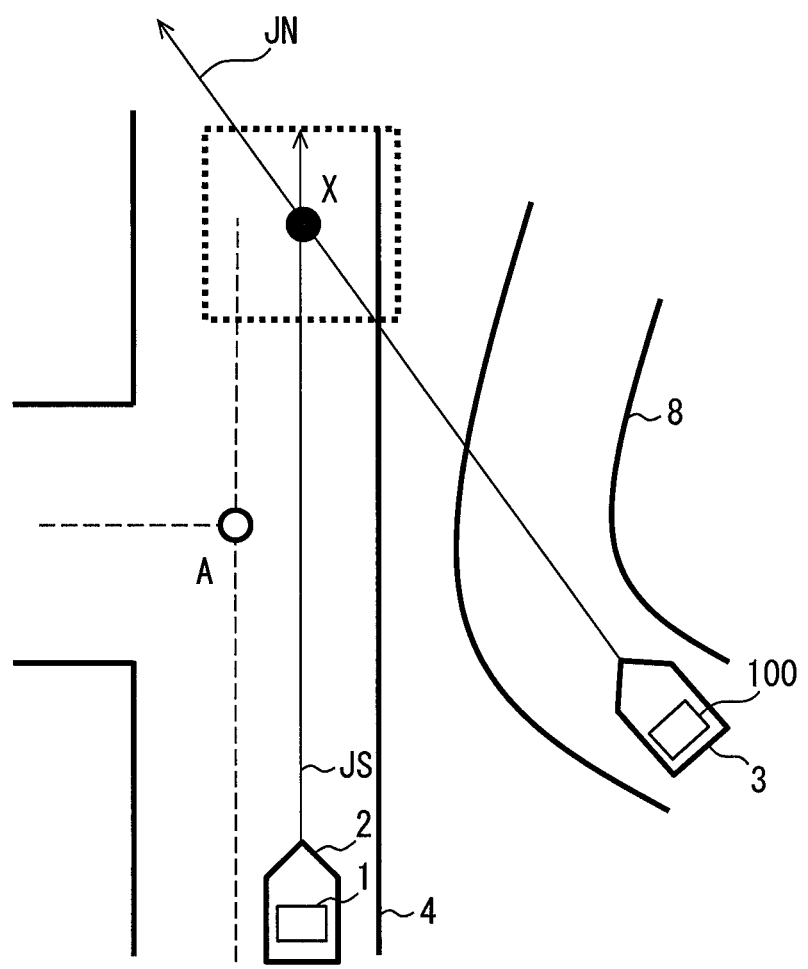
FIG. 7 is a diagram illustrating an example of suppressing driving assistance.

As in FIG. 7, the neighboring vehicle 3 travels a road 8 that does not intersect with the road 4 while the neighboring vehicle 3 travels near the road 4 the subject vehicle 2 travels. In this case, determination area B often does not contain intersection node A. The driving assistance is unnecessary and is disabled.

Summary of the First Embodiment

According to the embodiment, the controller 13 sets up determination area B at S8 based on crossing point X, if available, between subject-vehicle estimated trajectory JS and neighboring-vehicle estimated trajectory JN. At Sill, the controller 13 determines whether determination area B contains intersection node A.

The subject vehicle 2 and the neighboring vehicle 3 are estimated to pass through the same intersection of roads when determination area B contains intersection node A. The subject vehicle 2 and the neighboring vehicle 3 are estimated not to pass through the same intersection of roads when determination area B does not contain intersection node A.

Generally, vehicles collide with each other in an intersection of roads. The subject vehicle 2 and the neighboring vehicle 3 are less likely to collide when the intersection of roads does not contain crossing point X, if available. Accordingly, determining whether determination area B contains intersection node A signifies determining whether the subject vehicle 2 and the neighboring vehicle 3 are highly likely to collide.

The subject vehicle 2 and the neighboring vehicle 3 are considered to be less likely to collide when the intersection of roads does not contain crossing point X. The controller 13 performs S113 when determination area B does not contain intersection node A. At S113, the controller 13 uses the driving assistance level that degrades or disables the driving assistance and is lower than S112 performed when determination area B contains intersection node A.

The embodiment settles current positions of the subject vehicle 2 and the neighboring vehicle 3 without performing the map matching process. A small amount of calculation suffices to determine whether a collision is highly likely to occur.

Second Embodiment

The second embodiment will be described. An element marked with the same reference numeral as that used hitherto may be contained in the description of the second embodiment or later and, in such a case, equals the element marked with the same reference numeral described in the preceding embodiment, unless otherwise specified. When only part of a configuration is described, the other parts of the configuration may conform to the embodiment that is already described.

Figure 8:
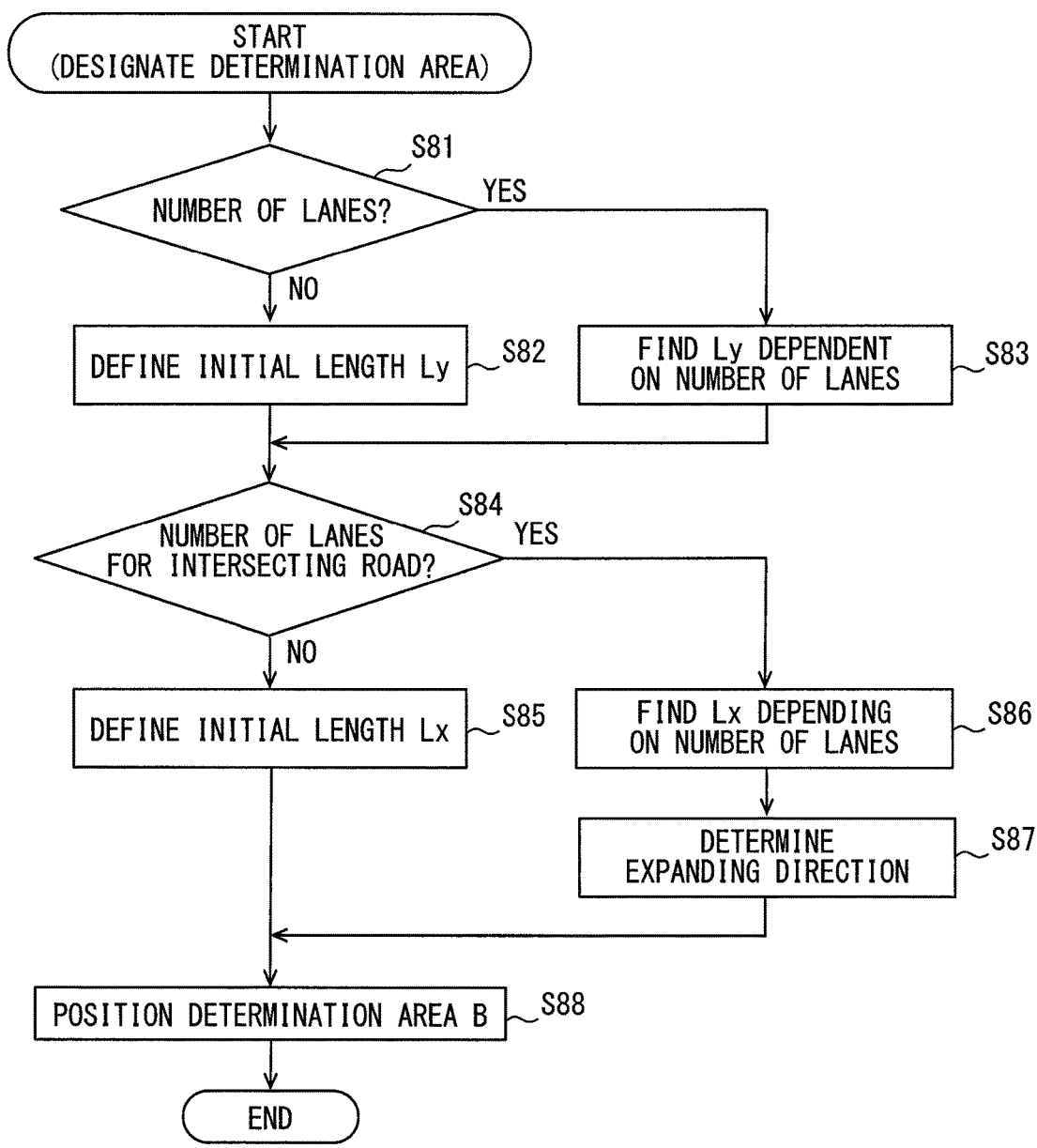
FIG. 8 is a flowchart illustrating a process according to a second embodiment performed in place of S8 in FIG. 3.

The second embodiment sets up determination area B by performing a process in FIG. 8 instead of 58 in FIG. 3. As described in the first embodiment, the controller 13 acquires the road map information near the subject vehicle at S4 from the traveling road determination apparatus 50. The road map information contains the link information. The link information about some roads includes the lane count information that provides the number of lanes (i.e., a lane count).

At S81, the controller 13 determines whether to acquire the lane count information about the road 4 the subject vehicle 2 travels. The lane count information configures the link information about links Lk41 and Lk42 in FIG. 9 when the road map information contains the lane count information about the road 4 the subject vehicle 2 travels. The lane count information about the road 4 traveled by the subject vehicle 2 corresponds to a traveled road width-related value.

The controller 13 proceeds to S82 if the determination at S81 results in NO. At S82, the controller 13 defines an initial length of length Ly, namely, length Ly in the longer direction of the road 4 the subject vehicle 2 travels in determination area B. The initial length corresponds to the length in the longer direction of the road 4 the subject vehicle 2 travels in determination area B according to the first embodiment.

The controller 13 proceeds to S83 if the determination at S81 results in YES. At S83, the controller 13 assumes length Ly in the longer direction of the road 4 the subject vehicle 2 travels in determination area B to be a length dependent on the number of lanes in the road 4 the subject vehicle 2 travels. Specifically, the controller 13 finds length Ly in the longer direction of the road 4 the subject vehicle 2 travels in determination area B by multiplying the number of lanes by coefficient fy representing the length per lane. Alternatively, the controller 13 may find length Ly by multiplying the number of lanes by coefficient fy plus a constant term.

At S84, the controller 13 determines whether to acquire the lane count information about a road that intersects with the road 4 traveled by the subject vehicle 2 at the nearest intersection of roads. A road 9 in FIG. 9 intersects with the road 4 traveled by the subject vehicle 2 at the nearest intersection of roads. The lane count information about the road 9 configures the link information about links Lk91 and Lk92 in FIG. 9 when the road map information contains the lane count information about the road 9. The lane count information about the road 9 corresponds to an intersecting road width-related value.

The controller 13 proceeds to S85 if the determination at S84 results in NO. At S85, the controller 13 defines an initial length of length Lx, namely, the length of a crossroad in the longer direction in determination area B, or more specifically, length Lx in the width direction of the road 4 the subject vehicle 2 travels in determination area B. The initial length corresponds to the length in the width direction of the road 4 the subject vehicle 2 travels in determination area B according to the first embodiment.

The controller 13 proceeds to S86 if the determination at S84 results in YES. At S86, the controller 13 assumes length Lx in the longer direction of the crossroad in determination area B to be a length dependent on the number of lanes in the crossroad. Specifically, the controller 13 finds length Lx in the longer direction in determination area B by multiplying the number of lanes by coefficient fx representing the length per lane. Alternatively, the controller 13 may find length Lx by multiplying the number of lanes by coefficient fx plus a constant term.

At S87, the controller 13 determines whether initial area D is expanded nearer to or farther from the subject vehicle 2 along subject-vehicle estimated trajectory JS so that initial area D is used as determination area B. Initial area D is in FIG. 9 and signifies determination area B formed around crossing point X if S82 and S85 are performed.

Figure 9:
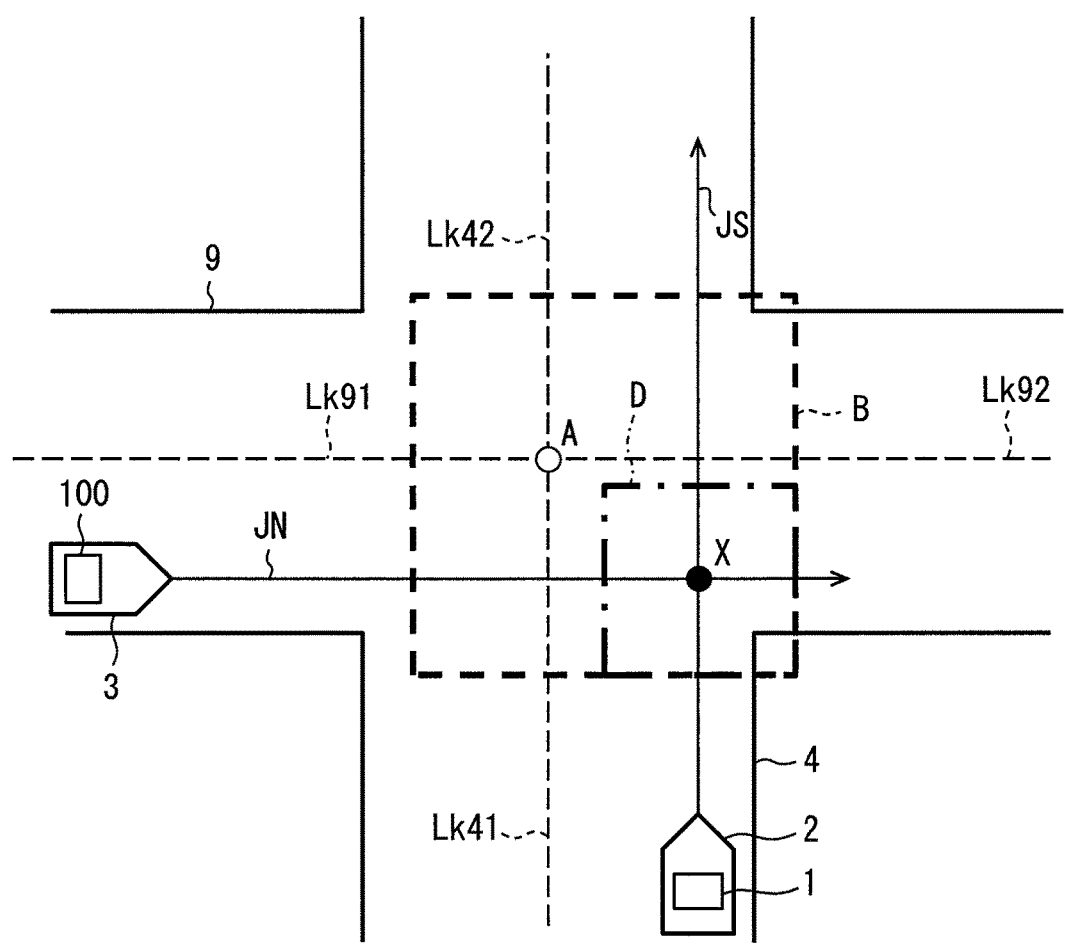
FIG. 9 is a diagram illustrating comparison between determination area B and initial area D set up based on the number of lanes according to the second embodiment.

Expanding initial area D in which direction along subject-vehicle estimated trajectory JS depends on whether the neighboring vehicle 3 exists to the right or left viewed from the subject vehicle 2 with reference to subject-vehicle estimated trajectory JS. FIG. 9 assumes a country where drivers keep to the right side of the road as a legal system. The neighboring vehicle 3 exists to the left of subject-vehicle estimated trajectory JS viewed from the subject vehicle 2. In this case, initial area D is expanded farther from the subject vehicle 2.

Figure 10:
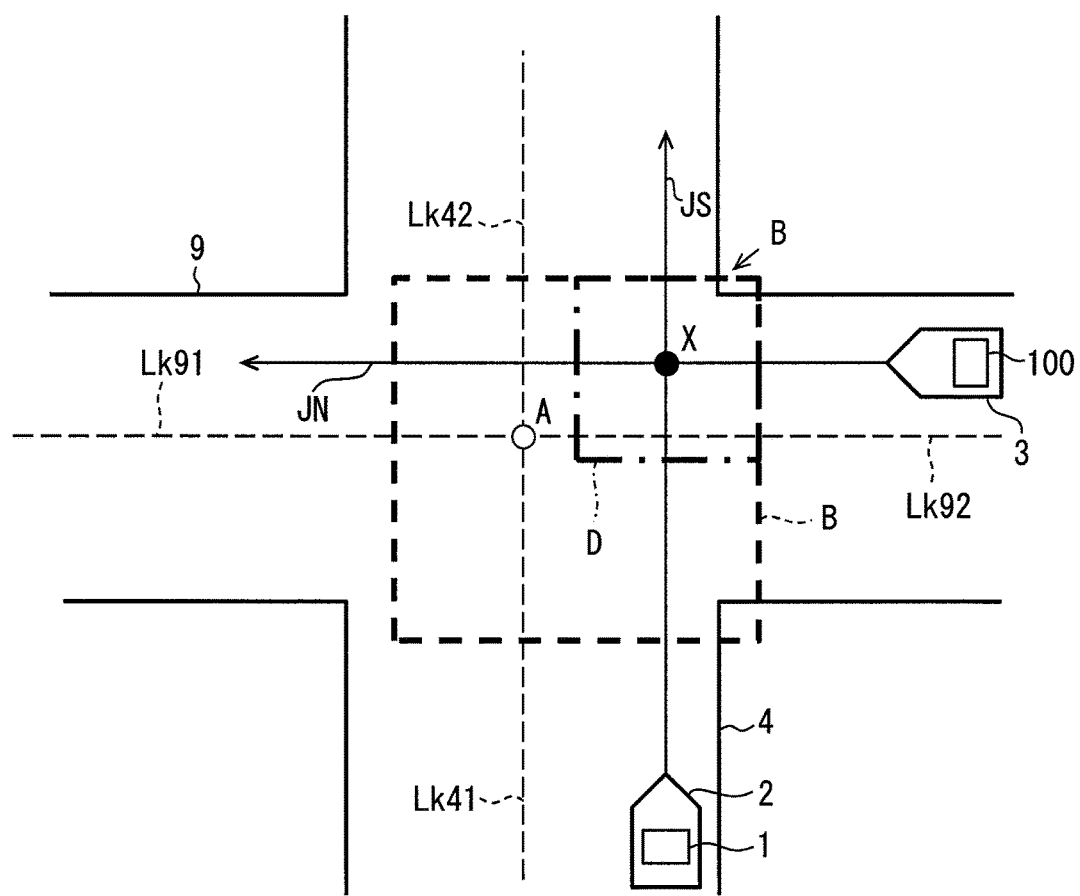
FIG. 10 is a diagram illustrating comparison between determination area B and initial area D set up based on the number of lanes according to the second embodiment.

FIG. 10 also assumes a country where drivers keep to the right side of the road as a legal system. However, the neighboring vehicle 3 exists to the right of subject-vehicle estimated trajectory JS viewed from the subject vehicle 2. In this case, initial area D is expanded nearer to the subject vehicle 2.

Expanding initial area D in the direction in FIG. 9 or 10 can allow determination area B to easily include intersection node A and prevent an area except the intersection of roads from expanding to be included in determination area B.

Suppose that the driving assistance system 1 is used in a country where drivers keep to the left side of the road as a legal system. In this case, the existence of the neighboring vehicle 3 with reference to subject-vehicle estimated trajectory JS viewed from the subject vehicle 2 corresponds to the direction of expanding initial area D contrary to the case of using the driving assistance system 1 in a country where drivers keep to the right side of the road as a legal system.

Initial area D is expanded nearer to the subject vehicle 2 if the neighboring vehicle 3 exists to the left of subject-vehicle estimated trajectory JS viewed from the subject vehicle 2 when the driving assistance system 1 is used in a country where drivers keep to the left side of the road as a legal system. Initial area D is expanded farther from the subject vehicle 2 if the neighboring vehicle 3 exists to the right of subject-vehicle estimated trajectory JS viewed from the subject vehicle 2 when the driving assistance system 1 is used in a country where drivers keep to the left side of the road as a legal system.

As in FIGS. 9 and 10, with respect to the direction intersecting with subject-vehicle estimated trajectory JS, determination area B is expanded in the width direction from the subject vehicle 2 to the center of the road 4 traveled by the subject vehicle 2 with reference to initial area D. Determination area B is expanded to the left from the subject vehicle 2 when the driving assistance system 1 is used in a country where drivers keep to the right side of the road as a legal system. Determination area B is expanded to the right from the subject vehicle 2 when the driving assistance system 1 is used in a country where drivers keep to the left side of the road as a legal system.

Lengths Lx and Ly of determination area B are already settled when S88 is performed. At S88, the controller 13 positions determination area B. If determination area B is sized equally to initial area D, crossing point X is naturally centered in determination area B or initial area D. In contrast, if determination area B is expanded from initial area D, crossing point X is still centered in initial area D but not centered in determination area B.

Effects of the Second Embodiment

According to the second embodiment, length Lx of determination area B is increased in accordance with the number of lanes of the road 4 traveled by the subject vehicle 2. The embodiment can prevent or suppress determination area B from excluding intersection node A even if the road 4 is wide.

Length Ly of determination area B is increased in accordance with the number of lanes of the road 9 intersecting with the road 4 traveled by the subject vehicle 2. The embodiment can prevent or suppress determination area B from excluding intersection node A even if the road 9 is wide.

In addition, length Lx of determination area B may be changed to be longer than the length corresponding to length Lx of initial area D. In this case, determination area B is expanded with reference to initial area D in the width direction from the subject vehicle 2 to the center of the road 4 traveled by the subject vehicle 2. Length Ly of determination area B may be changed to be longer than the length corresponding to length Ly of initial area D. In this case, the embodiment determines the direction of expanding determination area B with reference to initial area D based on whether the neighboring vehicle 3 exists to the right or left of subject-vehicle estimated trajectory 3S viewed from the subject vehicle 2. The embodiment can thereby prevent or suppress an area except the intersection of roads from expanding to be included in determination area B even if determination area B is enlarged. Thus, the embodiment can prevent or suppress determination area B from including intersection node A though the intersection of roads does not include crossing point X.

Third Embodiment

The third embodiment will be described. For convenience sake, the third embodiment represents the subject vehicle and the neighboring vehicle as subject vehicle SV and neighboring vehicle NV by using reference symbols different from the first and second embodiments. The other reference numerals and symbols are not changed. The third embodiment determines the shape of subject-vehicle estimated trajectory JS by using travel track Tr of neighboring vehicle NV while the first and second embodiments use linear subject-vehicle estimated trajectory 3S. The embodiment also determines the shape of neighboring-vehicle estimated trajectory JN for first neighboring vehicle NV by using travel track Tr corresponding to the neighboring-vehicle estimated trajectory JN of second neighboring vehicle NV different from first neighboring vehicle NV.

Figure 14:
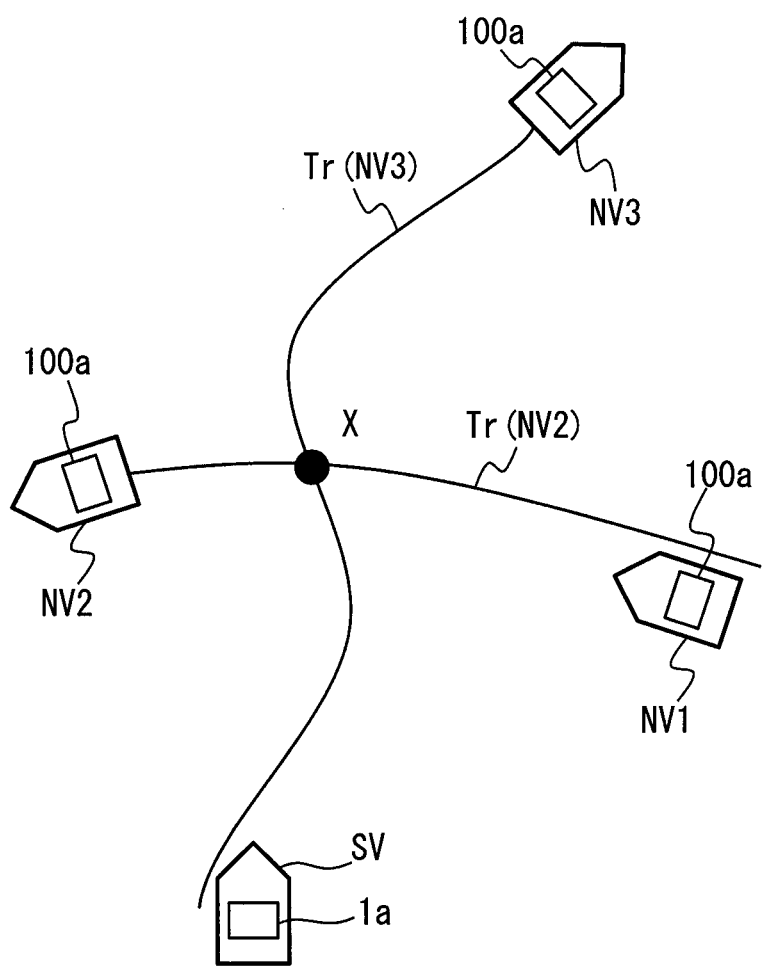
FIG. 14 is a diagram illustrating a method of determining subject-vehicle estimated trajectory JS and neighboring-vehicle estimated trajectory JN according to a third embodiment.

FIG. 14 illustrates three neighboring vehicles NV, namely, NV1, NV2, and NV3. The neighboring vehicles NV1, NV2, NV3 are each mounted with a driving assistance system 100a.

The driving assistance system 100 according to the first and second embodiments successively transmits a set of neighboring vehicle information. In contrast, the driving assistance system 100a transmits several sets of neighboring vehicle information including a set of neighboring vehicle information at the most recent time point. Each set of neighboring vehicle information according to the third embodiment equals the neighboring vehicle information according to the first and second embodiments except that the neighboring vehicle information according to the third embodiment excludes the yaw rate. Namely, each set of neighboring vehicle information according to the third embodiment includes the position, the absolute orientation, and the vehicle speed of neighboring vehicle NV. The position of neighboring vehicle NV is determined based on a navigation signal. The several sets of neighboring vehicle information specify several positions of neighboring vehicle NV at several time points because the neighboring vehicle information includes the position of neighboring vehicle NV. Several positions of neighboring vehicle NV at several time points can be assumed to be travel track Tr of neighboring vehicle NV. Therefore, several sets of neighboring vehicle information correspond to travel track information or trajectory estimation information.

The number of sets of neighboring vehicle information to be transmitted can be specified variously. For example, it is possible to transmit the number of sets of neighboring vehicle information sufficient to be capable of generating a travel track for a specified distance such as 200 meters. The number of sets varies with a speed. Alternatively, it may be allowed to transmit the predetermined number of sets of neighboring vehicle information. In this case, the number of sets is specified as follows. An average travel speed and the specified distance are used to calculate a travel time required to travel the specified distance. The travel time is divided by a sampling cycle for a set of neighboring vehicle information to find the number of sets. The sampling cycle equals a cycle of transmitting sets of neighboring vehicle information, for example. The description to follow may express the sets of neighboring vehicle information simply as the neighboring vehicle information.

The neighboring vehicle information according to the third embodiment excludes the yaw rate. Therefore, the driving assistance system 100a need not include the yaw rate sensor 40. The other hardware configuration of the driving assistance system 100a may equal that of the driving assistance system 100.

Subject vehicle SV is mounted with a driving assistance system 1a. In this example, subject vehicle SV travels near travel track Tr (NV3) of neighboring vehicle NV3. The driving assistance system 1a uses travel track Tr (NV3) to determine subject-vehicle estimated trajectory JS. Neighboring vehicle NV1 travels near travel track Tr (NV2) of neighboring vehicle NV2, The driving assistance system 1a uses travel track Tr (NV2) to determine neighboring-vehicle estimated trajectory JN of neighboring vehicle NV1.

The hardware configuration of the driving assistance system 1a equals that of the first and second embodiments. The controller 13 included in the driving assistance system 1a according to the third embodiment performs a process in FIG. 15 instead of the process in FIG. 3. In addition to the process in FIG. 15, the controller 13 performs a process to periodically transmit the subject vehicle information and a process to temporarily store the neighboring vehicle information in specified memory when the short-range wireless communication unit 12 receives the neighboring vehicle information. A period to store the neighboring vehicle information in the memory may be long enough to perform the process in FIG. 15 once.

The description below explains the process in FIG. 15. The process at S201 equals the process at S1. The controller 13 acquires a current position of subject vehicle SV from the GNSS reception unit 11. S201 corresponds to a subject vehicle position determination section or a subject vehicle position determiner. The process at S202 equals the process at S2. The controller 13 acquires the subject vehicle information except the current position.

Figure 15:
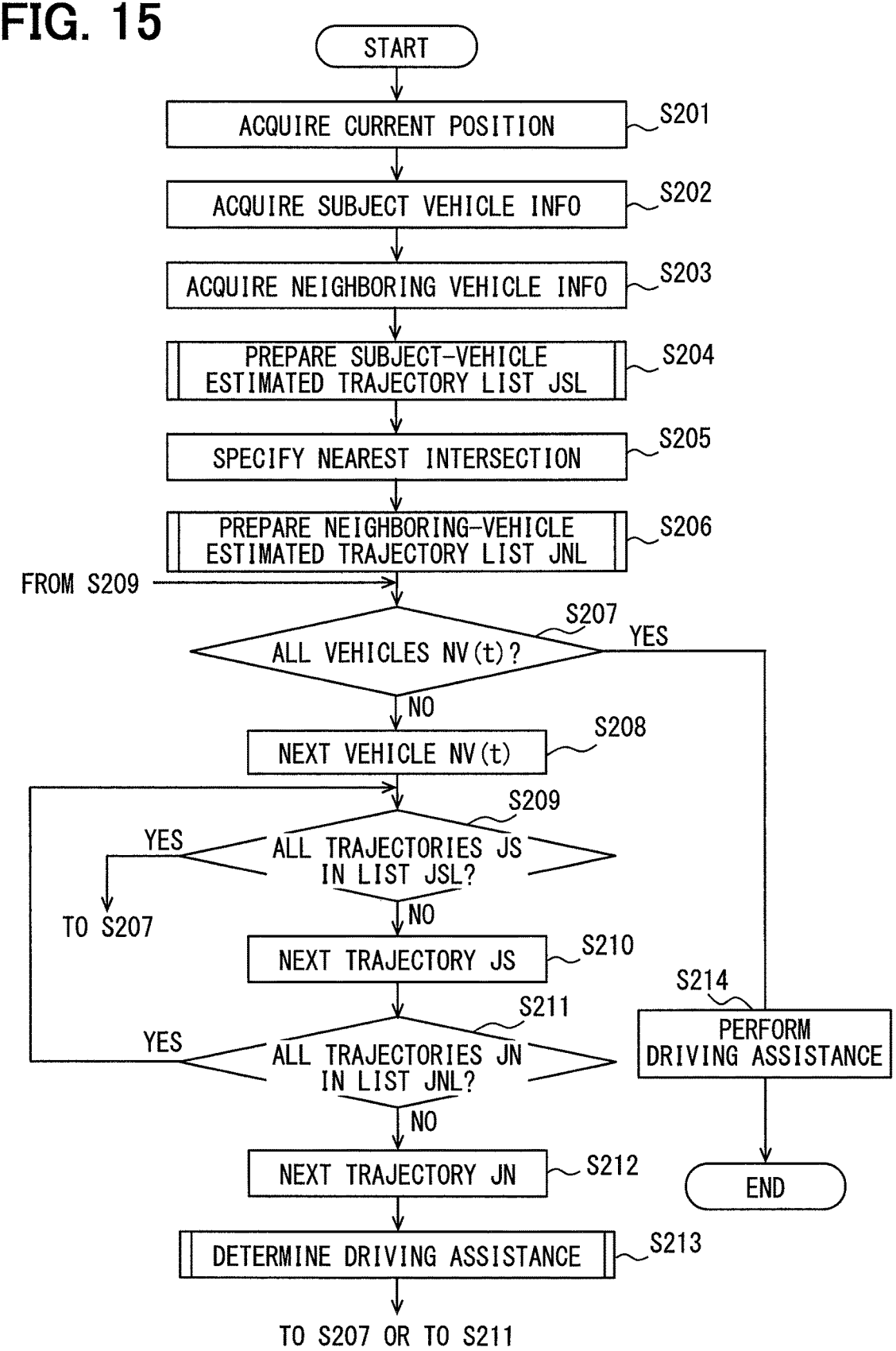
FIG. 15 is a flowchart illustrating a process performed by the controller of the driving assistance system according to the third embodiment.

At S203, the controller 13 acquires the neighboring vehicle information from the memory on condition that the short-range wireless communication unit 12 receives the neighboring vehicle information between the previous execution of the process in FIG. 15 and the most recent execution of the same. As above, the neighboring vehicle information corresponds to the travel track information and the trajectory estimation information. S203 corresponds to a track information acquisition section or a track information acquirer and a trajectory estimation information acquisition section or a trajectory estimation information acquirer.

Figure 16:
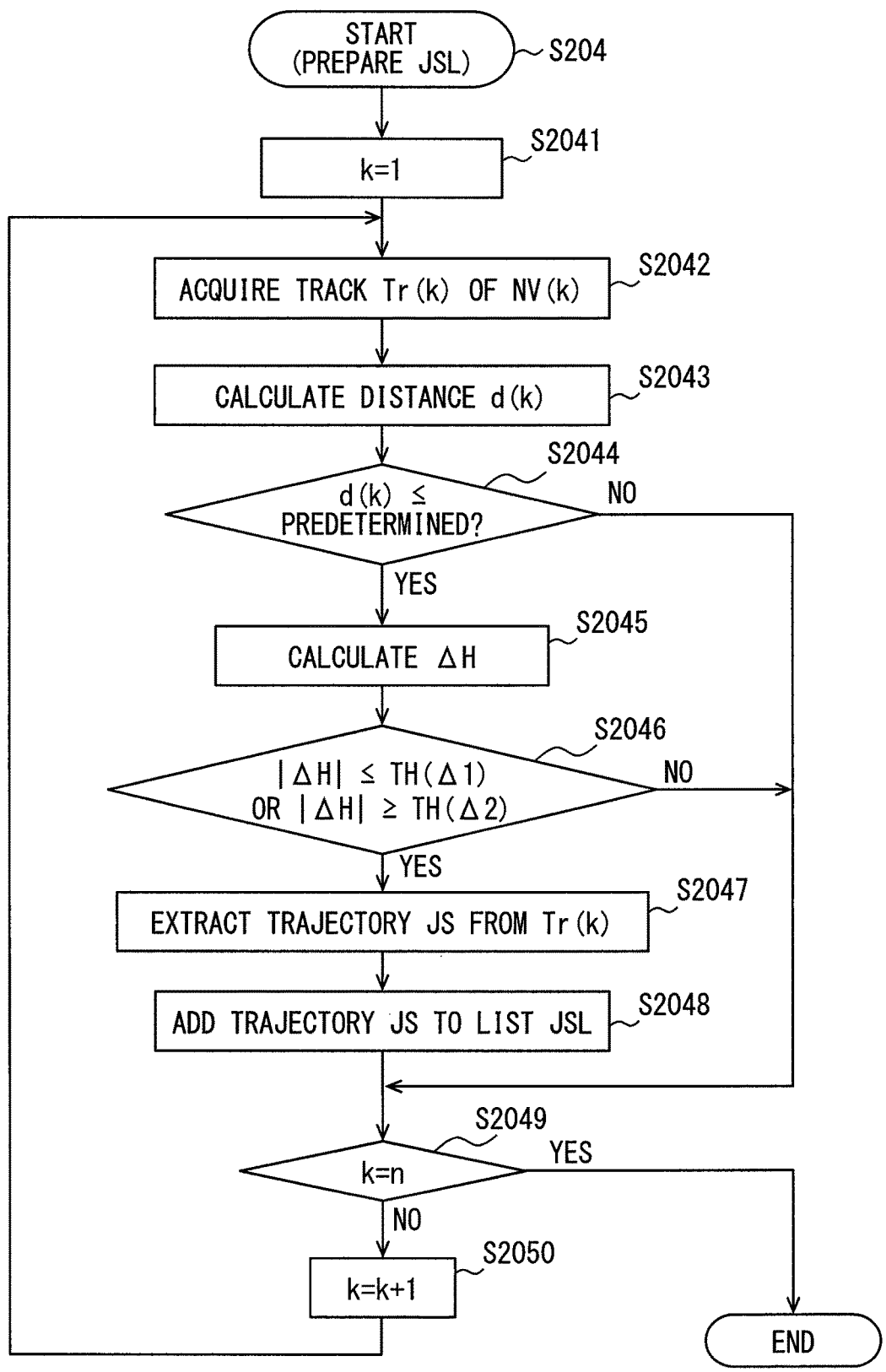
FIG. 16 is a flowchart illustrating the process at S204 in FIG. 15 in detail.

At S204, the controller 13 generates subject-vehicle estimated trajectory list JSL. S204 corresponds to a subject vehicle estimation section or a subject vehicle estimator. Subject-vehicle estimated trajectory list JSL stores one or more subject-vehicle estimated trajectories JS. FIG. 16 illustrates the process at S204 in detail.

At S2041 in FIG. 16, the controller 13 initializes subject-vehicle estimated trajectory list JSL. The controller 13 sets k to 1. At S2042, the controller 13 acquires travel track Tr(k) of neighboring vehicle NV(k). Travel track Tr(k) is contained in the neighboring vehicle information transmitted from neighboring vehicle NV(k) and denotes the position of neighboring vehicle NV(k) at successive time points from the most recent position. The neighboring vehicle NV periodically transmits the neighboring vehicle information. The memory stores the neighboring vehicle information transmitted from neighboring vehicle NV that exists within a reception range for the short-range wireless communication unit 12. At S203, the controller 13 acquires the neighboring vehicle information received by the short-range wireless communication unit 12 from the memory during a period between the previous execution of the process in FIG. 15 and the current execution of the same. At S2042, the controller 13 acquires travel track Tr(k) contained in the neighboring vehicle information.

Figure 17:
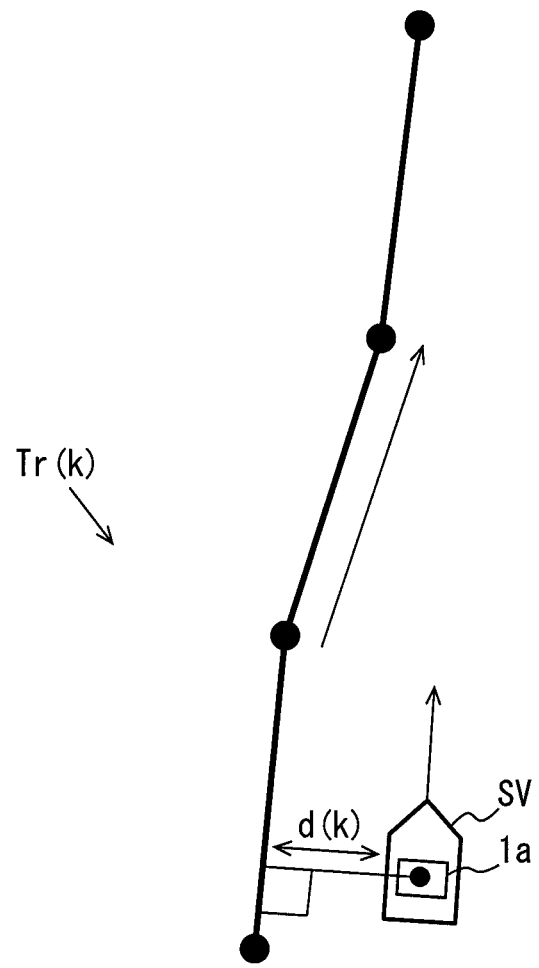
FIG. 17 is a diagram illustrating a method of calculating distance d(k) at S2043 in FIG. 16.

At S2043, the controller 13 calculates distance d(k) from the current position of subject vehicle SV to travel track Tr(k) acquired at S2042. FIG. 17 illustrates distance d(k). As in FIG. 17, distance d(k) denotes the shortest length of a perpendicular line extended from the current position of subject vehicle SV to a line segment formed by connecting positions belonging to travel track Tr(k).

At S2044, the controller 13 determines whether distance d(k) calculated at S2043 is shorter than or equal to a predetermined distance. Travel track Tr(k) can be used to determine subject-vehicle estimated trajectory JS on condition that distance d(k) is shorter than or equal to the predetermined distance. The predetermined distance is used to determine whether the current position of subject vehicle SV is near to travel track Tr(k). The predetermined distance is set to 10 m, for example. The controller 13 proceeds to S2049 if the determination at S2044 results in NO. The controller 13 proceeds to S2045 if the determination at S2044 results in YES.

At S2045, the controller 13 calculates azimuth difference ΔH. Azimuth difference ΔH denotes a difference between azimuth angle SEG_H of the line segment used to calculate distance d(k) and the absolute orientation of subject vehicle SV (hereinafter referred to as azimuth angle SV_H of subject vehicle SV). Azimuth difference ΔH equals SEG_H−SV_H represented as an angle between −180 and 180 degrees.

At S2046, the controller 13 determines whether azimuth difference ΔH calculated at S2045 is smaller than or equal to first azimuth difference threshold value TH (Δ1) or larger than or equal to second azimuth difference threshold value TH (Δ2). This determines whether the traveling direction of subject vehicle SV is approximately parallel to a line segment nearest to the current position of subject vehicle SV along travel track Tr(k). For example, first azimuth difference threshold value TH (Δ1) is set to 20 degrees and second azimuth difference threshold value TH (Δ2) is set to 160 degrees. S2046 determines the condition of an angle so that travel track Tr(k) can be used to determine subject-vehicle estimated trajectory JS.

The controller 13 proceeds to S2049 if the determination at S2046 results in NO. The controller 13 proceeds to S2047 if the determination at S2046 results in YES. The process from S2041 to S2046 corresponds to a subject vehicle track determination section or a subject vehicle track determiner. S2047 corresponds to a subject-vehicle estimated trajectory determination section or a subject-vehicle estimated trajectory determiner.

At S2047, the controller 13 extracts subject-vehicle estimated trajectory JS from travel track Tr(k). One end of subject-vehicle estimated trajectory JS extracted from travel track Tr(k) corresponds to a point nearest to subject vehicle SV along travel track Tr(k). The other end of subject-vehicle corresponds to the current position of neighboring vehicle NV(k) when travel track Tr(k) belongs to neighboring vehicle NV(k) that travels in the same direction as subject vehicle SV. Alternatively, the other end may be determined at the predetermined distance from the one end. The other end is determined at the predetermined distance from the one end when travel track Tr(k) belongs to neighboring vehicle NV(k) that travels in a direction opposite to subject vehicle SV.

At S2048, the controller 13 adds subject-vehicle estimated trajectory JS extracted at S2047 to subject-vehicle estimated trajectory list JSL. One end of subject-vehicle estimated trajectory JS extracted at S2047 does not always correspond to the current position of subject vehicle SV. One end of subject-vehicle estimated trajectory JS extracted at S2047 may be used as the current position of subject vehicle SV by translating subject-vehicle estimated trajectory JS extracted at S2047. Alternatively, subject-vehicle estimated trajectory JS extracted at S2047 may be directly added to subject-vehicle estimated trajectory list JSL without translation. At S2049, the controller 13 determines whether k equals n. In this case, n denotes the number of neighboring vehicles NV from which the controller 13 receives the neighboring vehicle information during one cycle of execution in FIG. 15, namely, the number of neighboring vehicles NV of which the neighboring vehicle information is stored in the memory during one cycle of execution in FIG. 15. The controller 13 proceeds to S2050 if the determination at S2049 results in NO. At S2050, the controller 13 increments k by one. The controller 13 then re-executes S2042 and later. The controller 13 terminates the process in FIG. 16 and proceeds to S205 in FIG. 15 if the determination at S2049 results in YES.

The process in FIG. 16 generates subject-vehicle estimated trajectory JS based on travel track Tr of neighboring vehicle NV in the vicinity of subject vehicle SV when travel track Tr contains a line segment that is nearest to the current position of subject vehicle SV and is approximately parallel to the traveling direction of subject vehicle SV. Subject-vehicle estimated trajectory list JSL stores this subject-vehicle estimated trajectory JS.

At S205 in FIG. 15, the controller 13 specifies the nearest intersection of roads ahead of subject vehicle SV in the traveling direction along a road where subject vehicle SV travels. This process equals S4.

Figure 18:
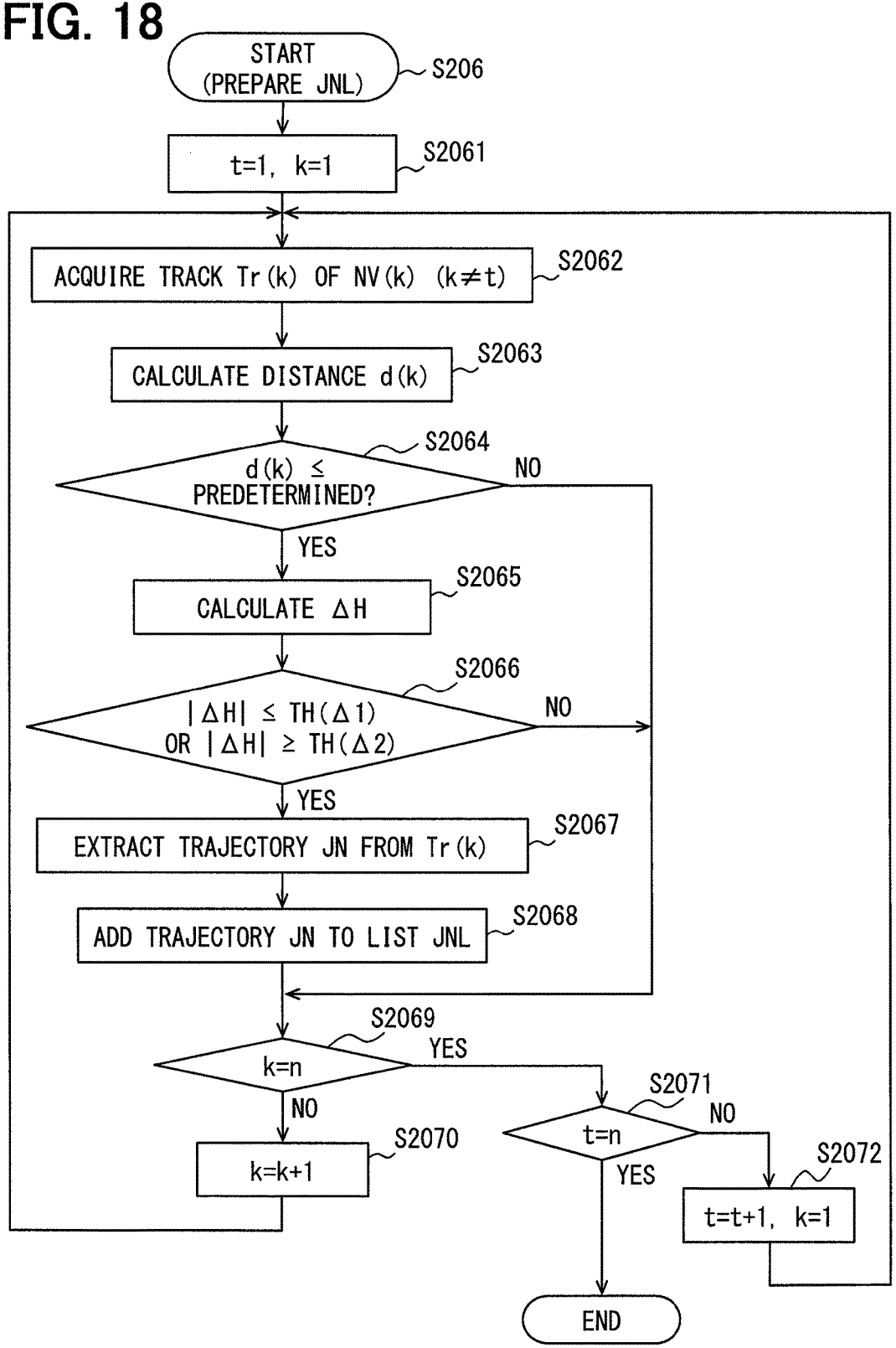
FIG. 18 is a flowchart illustrating the process at S206 in FIG. 15 in detail.

At S206, the controller 13 generates neighboring-vehicle estimated trajectory list JNL. Neighboring-vehicle estimated trajectory list JNL stores one or more neighboring-vehicle estimated trajectories JN. FIG. 18 illustrates the process at S206 in detail.

At S2061 in FIG. 18, the controller 13 initializes neighboring-vehicle estimated trajectory list JNL. The controller 13 sets t to 1 and k to 1. At S2062, the controller 13 acquires travel track Tr(k) of neighboring vehicle NV(k). Value k differs from t. Value t is used for neighboring vehicle NV(t) to generate neighboring-vehicle estimated trajectory list JNL during the process in FIG. 18. Here, due to k≠t, at S2062, the controller 13 acquires travel track Tr(k) of neighboring vehicle NV(k) other than neighboring vehicle NV(t) that is used to generate neighboring-vehicle estimated trajectory list JNL during the process in FIG. 18. Neighboring vehicle NV(t) denotes a first neighboring vehicle. Neighboring vehicle NV(k) denotes a second neighboring vehicle under the condition of k≠t.

At S2063, the controller 13 calculate distance d(k) from the current position of neighboring vehicle NV(t) to travel track Tr(k) acquired at S2062. The controller 13 calculates distance d(k) in the same method as S2043 by using the current position of neighboring vehicle NV(t) instead of the current position of subject vehicle SV. At S2064, the controller 13 determines whether distance d(k) calculated at S2063 is shorter than or equal to the predetermined distance. The predetermined distance is used to determine whether the current position of neighboring vehicle NV(t) is near to travel track Tr(k). The predetermined distance is set to 10 m, for example. Travel track Tr(k) can be used to determine neighboring-vehicle estimated trajectory JN on condition that distance d(k) is shorter than or equal to the predetermined distance. The controller 13 proceeds to S2069 if the determination at S2064 results in NO. The controller 13 proceeds to S2065 if the determination at S2064 results in YES.

At S2065, the controller 13 calculates azimuth difference ΔH. Azimuth difference ΔH denotes a difference between azimuth angle SEG_H of the line segment used to calculate distance d(k) and the absolute orientation of neighboring vehicle NV(t). The controller 13 calculates azimuth difference ΔH at S2065 in the same method as S2045 by replacing the absolute orientation of subject vehicle SV with the absolute orientation of neighboring vehicle NV(t).

At S2066, the controller 13 determines whether azimuth difference ΔH calculated at S2065 is smaller than or equal to first azimuth difference threshold value TH (Δ1) or larger than or equal to second azimuth difference threshold value TH (Δ2). This determines whether the traveling direction of neighboring vehicle NV(t) is approximately parallel to a line segment nearest to the current position of neighboring vehicle NV(t) along travel track Tr(k). Therefore, actual values for first azimuth difference threshold value TH (Δ1) and second azimuth difference threshold value TH (Δ2) may comply with S2046. S2066 determines the condition of an angle so that travel track Tr(k) can be used to determine neighboring-vehicle estimated trajectory JN. The controller 13 proceeds to S2069 if the determination at S2066 results in NO. The controller 13 proceeds to S2067 if the determination at S2066 results in YES. The process S2061 through S2066 corresponds to a neighboring vehicle track determination section or a neighboring vehicle track determiner. S2067 corresponds to a neighboring-vehicle estimated trajectory determination section or a neighboring-vehicle estimated trajectory determiner.

At S2067, the controller 13 extracts neighboring-vehicle estimated trajectory JN from travel track Tr(k). To do this, the same method as S2047 may be used. At S2068, the controller 13 adds neighboring-vehicle estimated trajectory JN extracted at S2067 to neighboring-vehicle estimated trajectory list JNL. Neighboring-vehicle estimated trajectory list JNL is generated for each neighboring vehicle NV(t). Neighboring-vehicle estimated trajectory list JNL corresponding to each neighboring vehicle NV(t) is assumed to be neighboring-vehicle estimated trajectory list JNL(t).

Similarly to S2048, one end of neighboring-vehicle estimated trajectory JN may be used as the current position of neighboring vehicle NV(t) by translating neighboring-vehicle estimated trajectory JN extracted at S2067. Alternatively, neighboring-vehicle estimated trajectory JN extracted at S2067 may be directly added to neighboring-vehicle estimated trajectory list JNL.

At S2069, the controller 13 determines whether k equals n. The controller 13 proceeds to S2070 if the determination at S2069 results in NO. At S2070, the controller 13 increments k by one. The controller 13 then re-executes S2062 and later. The controller 13 proceeds to S2071 if the determination at S2069 results in YES.

At S2071, the controller 13 determines whether t equal n. The controller 13 proceeds to S2072 if the determination at S2071 results in NO. At S2072, the controller 13 increments t by one and sets k to 1. The controller 13 then re-executes S2062 and later. The controller 13 terminates the process in FIG. 18 and proceeds to S207 in FIG. 15 if the determination at S2071 results in YES.

At S207 in FIG. 15, the controller 13 determines whether driving assistance determination (to be described) is performed on all neighboring vehicles NV. The controller 13 proceeds to S214 if the determination at S207 results in YES. The controller 13 proceeds to S208 if the determination at S207 results in NO.

At S208, the controller 13 selects next neighboring vehicle NV(t) as a determination target. At S209, the controller 13 determines whether the driving assistance determination in relation to neighboring vehicle NV(t) is performed on all subject-vehicle estimated trajectories 35 in subject-vehicle estimated trajectory list JSL. The controller 13 returns to S207 if the determination at S209 results in YES. The controller 13 proceeds to S210 if the determination at S209 results in NO.

At S210, the controller 13 selects next neighboring vehicle NV(t) stored in subject-vehicle estimated trajectory list JSL as a determination target. At S211, the controller 13 determines whether the driving assistance determination at S213 is performed on all neighboring-vehicle estimated trajectories JN in neighboring-vehicle estimated trajectory list JNL(t). The controller 13 returns to S209 if the determination at S211 results in YES. The controller 13 proceeds to S212 if the determination at S211 results in NO.

At S212, the controller 13 selects next neighboring-vehicle estimated trajectory JN in neighboring-vehicle estimated trajectory list JNL(t) as a target of the driving assistance determination in relation to subject-vehicle estimated trajectory JS. The controller 13 then proceeds to S213.

Figure 19:
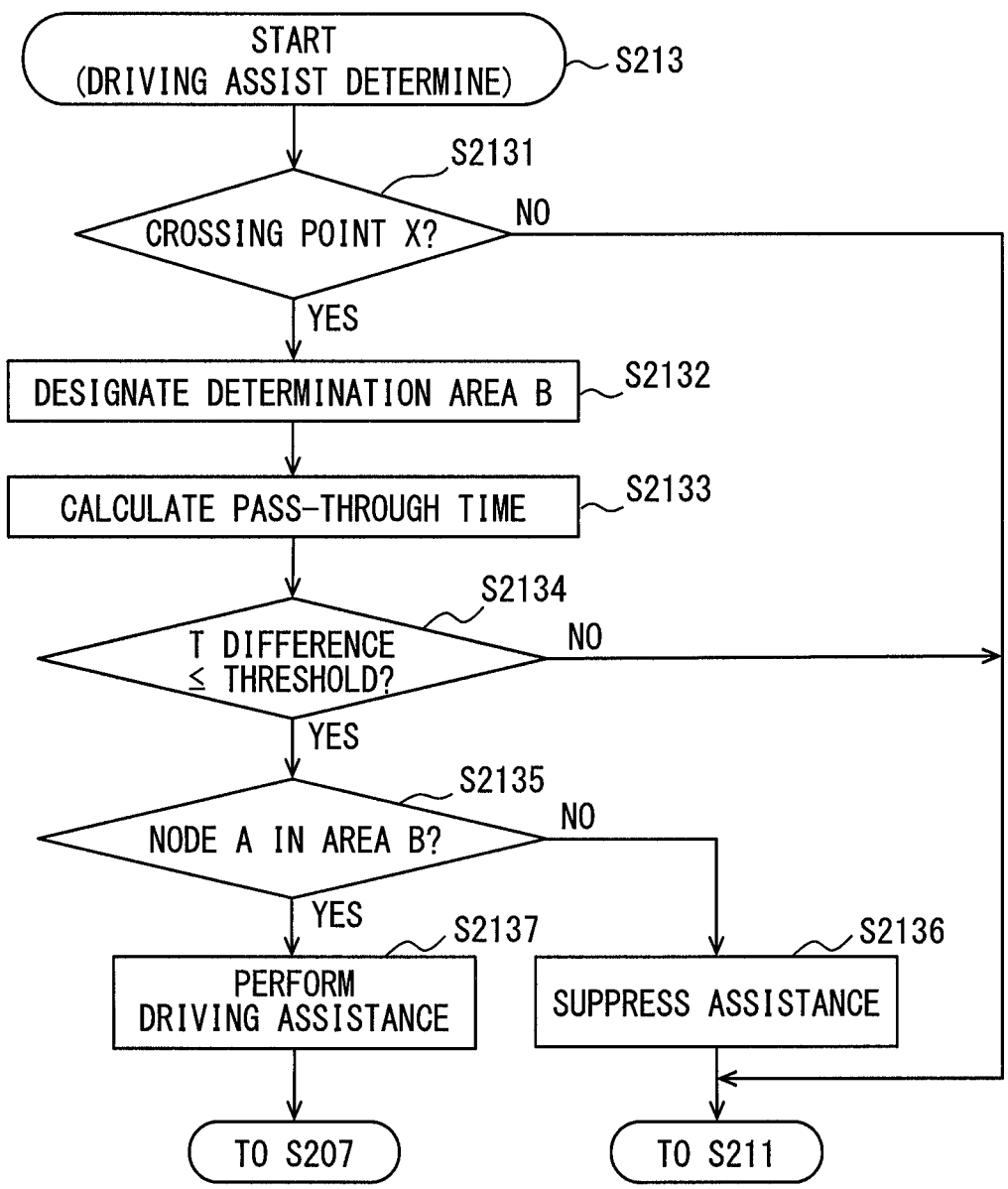
FIG. 19 is a flowchart illustrating the process at S213 in FIG. 15 in detail.

At S213, the controller 13 performs the driving assistance determination. FIG. 19 illustrates the driving assistance determination in detail.

At S2131 in FIG. 19, the controller 13 determines whether crossing point X exists on subject-vehicle estimated trajectory JS and neighboring-vehicle estimated trajectory JN as the current determination target. The controller 13 terminates the process in FIG. 19 and proceeds to S211 in FIG. 15 when determining that crossing point X does not exist. The controller 13 proceeds to S2132 when determining that crossing point X exists.

At S2132, the controller 13 sets up or designates determination area B. S2132 corresponds to an area designation section or an area designator. The process at S2132 may equal S8. At S2133, the controller 13 calculates pass-through time required for subject vehicle SV to pass through crossing point X and pass-through time required for neighboring vehicle NV to pass through crossing point X. The process at S2133 may equal S9.

At S2134, the controller 13 determines whether a time difference between the pass-through time for subject vehicle SV and the pass-through time for neighboring vehicle NV is smaller than or equal to a predetermined threshold value. The process at S2134 may equal S10. The controller 13 terminates the process in FIG. 19 and proceeds to S211 in FIG. 15 if the determination at S2134 results in NO. The controller 13 proceeds to S2135 if the determination at S2134 results in YES.

The process at S2135 corresponds to a determination section or an intersection determiner and determines whether determination area B contains intersection node A in the road map information. The controller 13 proceeds to S2137 if the determination at S2135 results in YES. The controller 13 proceeds to S2136 if the determination at S2135 results in NO. S2136 and S2137 correspond to a driving assistance section, a driving assistance processor, or a driving assistant.

At S2316, the controller 13 determines to disable the driving assistance. At S2317, the controller 13 determines to perform the driving assistance. The meaning of performing or disabling the driving assistance complies with the first embodiment.

The controller 13 proceeds to S211 in FIG. 15 when S2136 is performed. The controller 13 performs the driving assistance determination on next neighboring-vehicle estimated trajectory JN in neighboring-vehicle estimated trajectory list JNL(t) when determining to disable the driving assistance.

The controller 13 proceeds to S207 in FIG. 15 when S2137 is performed. The controller 13 performs the driving assistance determination on next neighboring vehicle NV(t) when at least once determining to perform the driving assistance on some neighboring vehicle NV(t) even though there is a combination of neighboring-vehicle estimated trajectory JN and subject-vehicle estimated trajectory JS on which no driving assistance determination is performed.

In FIG. 15, the process at S207 through S213 performs the driving assistance determination on all combinations of neighboring-vehicle estimated trajectory JN and subject-vehicle estimated trajectory JS contained in neighboring-vehicle estimated trajectory list JNL(t) until S2137 determines to perform the driving assistance on each neighboring vehicle NV(t).

The determination at S207 results in YES when the driving assistance determination is performed on all neighboring vehicles NV(t). The controller 13 then proceeds to S214. At S214, the controller 13 performs the driving assistance on most alarming neighboring vehicle NV(t). Most alarming neighboring vehicle NV(t) is characterized by the highest driving assistance level and the shortest time to reach the nearest intersection of roads, for example.

As above, the third embodiment determines subject-vehicle estimated trajectory JS based on travel track Tr that belongs to neighboring vehicle NV having traveled near the current position of subject vehicle SV and contains a line segment nearest to the current position of subject vehicle SV while the line segment is approximately parallel to the traveling direction of subject vehicle SV. The third embodiment can accurately determine subject-vehicle estimated trajectory JS.

The embodiment determines neighboring-vehicle estimated trajectory JN for neighboring vehicle NV(t) similarly to subject-vehicle estimated trajectory JS based on travel track Tr(k) for neighboring vehicle NV(k) different from neighboring vehicle NV(t). The embodiment can accurately determine neighboring-vehicle estimated trajectory JN.

The embodiment performs the driving assistance determination based on subject-vehicle estimated trajectory JS and neighboring-vehicle estimated trajectory JN determined as above. The accurate determination is available.

While there have been described the embodiments of the present disclosure, the disclosure is not limited to the above-mentioned embodiments. Embodiments described below are also included in the technical scope of the disclosure. Furthermore, the disclosure may be embodied in various modifications without departing from the spirit and scope of the disclosure.

First Modification

Figure 11:
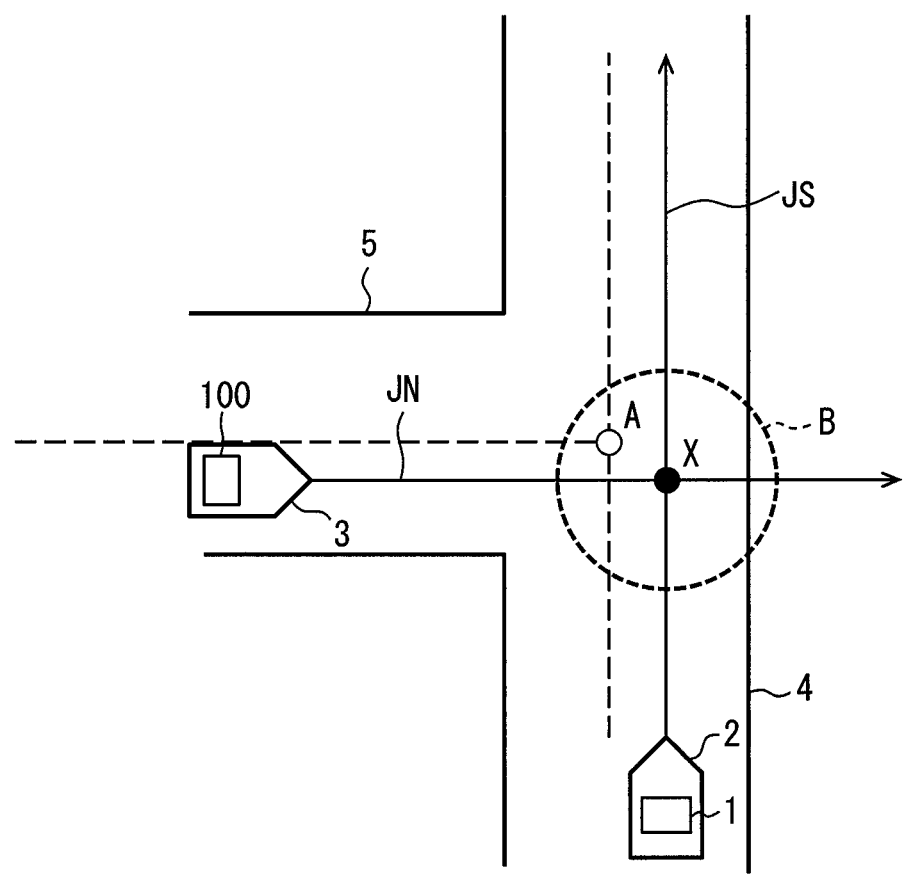
FIG. 11 is a diagram illustrating determination area B according to a first modification.

According to the embodiments, determination area B is a parallelogram but may be a circle as in FIG. 11.

Determination area B may be a quadrangle other than a parallelogram. Determination area B may be a polygon other than a quadrangle. One side of determination area B need not orthogonal to subject-vehicle estimated trajectory JS. For example, quadrangular determination area B may be placed so that subject-vehicle estimated trajectory JS or neighboring-vehicle estimated trajectory JN passes through a diagonal of the quadrangle. The description below explains an example of configuring quadrangular determination area B whose side intersecting with subject-vehicle estimated trajectory JS is not orthogonal to subject-vehicle estimated trajectory JS.

Figure 12:
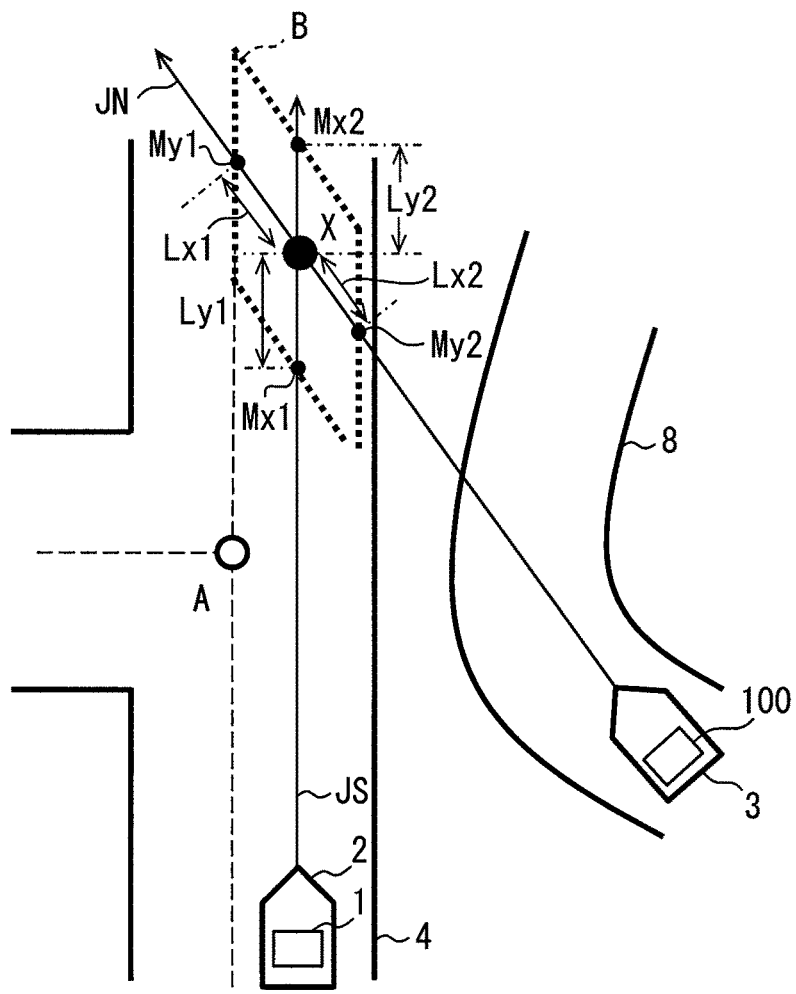
FIG. 12 is a diagram illustrating a method of setting up determination area B according to the first modification.

As in FIG. 12, point Mx1 is placed on subject-vehicle estimated trajectory IS to be distant from crossing point X by length Ly1. Point Mx2 is placed in a direction opposite to point Mx1 on subject-vehicle estimated trajectory JS to be distant from crossing point X by length Ly2. Point My1 is placed on neighboring-vehicle estimated trajectory JN to be distant from crossing point X by length Lx1. Point My2 is placed in a direction opposite to point My1 on neighboring-vehicle estimated trajectory JN to be distant from crossing point X by length Lx2. Determination area B is defined as a parallelogram so that the four sides pass through four points Mx1, Mx2, My1, and My2, one pair of parallel sides is parallel to subject-vehicle estimated trajectory JS, and the other pair of parallel sides is parallel to neighboring-vehicle estimated trajectory JN. According to this example, determination area B is shaped into a parallelogram whose four angles are not orthogonal when subject-vehicle estimated trajectory JS is not orthogonal to neighboring-vehicle estimated trajectory JN.

Second Modification

An arc of turning radius R of the subject vehicle 2 may be used as a direction in which the subject vehicle 2 travels. The arc is formed to be in contact with a front-back direction line for the subject vehicle 2 with reference to the current position of the subject vehicle 2 as a basing point. The front-back direction line for the subject vehicle 2 represents the absolute orientation of the subject vehicle 2. Turning radius R of the subject vehicle 2 can be calculated by dividing the vehicle speed by the yaw rate.

Figure 13:
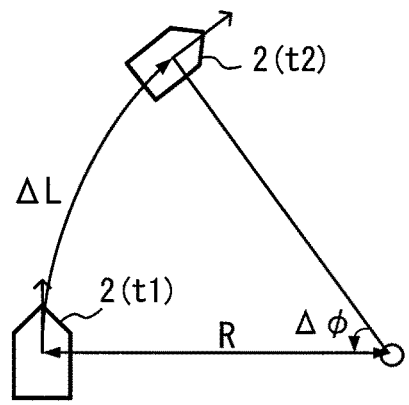
FIG. 13 is a diagram illustrating relation among turning radius R, arc $\Delta L$, and central angle $\Delta \phi$.

Turning radius R can be calculated by dividing the vehicle speed by the yaw rate for the following reason. As in FIG. 13, a travel track for the subject vehicle 2 corresponds to the arc of turning radius R. The subject vehicle 2 travels $\Delta L$ from time t1 to time t2. A valid expression is $\Delta L = R \times \Delta\phi$ when fan-shaped central angle $\Delta\phi$ is accompanied by arc $\Delta L$ and is sufficiently small. Therefore, a valid expression is $R = \Delta L / \Delta\phi = (\Delta L / \Delta t)/(\Delta\phi/\Delta t) =$ vehicle speed divided by yaw rate. According to the second modification, S2 corresponds to an acquisition section or a speed and yaw rate acquirer.

Third Modification

The neighboring vehicle 3 is similar to the subject vehicle 2. At S6, an arc of turning radius R of the neighboring vehicle 3 may be used as a direction in which the neighboring vehicle 3 travels. The arc is formed to be in contact with a front-back direction line for the neighboring vehicle 3 with reference to the current position of the neighboring vehicle 3 as a basing point. The third modification determines neighboring-vehicle estimated trajectory JN by using the yaw rate included in the neighboring vehicle information. Unlike the third modification, the above-mentioned embodiments determine neighboring-vehicle estimated trajectory JN without using the yaw rate. According to the embodiments, the neighboring vehicle information may not include the yaw rate.

Fourth Modification

The width of the road 4 traveled by the subject vehicle 2 may be used as the traveled road width-related value that conforms to the number of lanes according to the above-mentioned embodiments. The width of a road intersecting with the road 4 traveled by the subject vehicle 2 may be used as the intersecting road width-related value.

Fifth Modification

Instead of the orientation sensor 20, a traveling orientation for the subject vehicle 2 may be determined based on a change in successively detected current positions of the subject vehicle 2. The yaw rate of the subject vehicle 2 may be calculated based on a change in successively detected current positions of the subject vehicle 2.

The neighboring vehicle 3 can be also configured similarly. The traveling orientation for the neighboring vehicle 3 may be determined based on a change in successively detected current positions of the neighboring vehicle 3. The yaw rate of the neighboring vehicle 3 may be calculated based on a change in successively detected current positions of the neighboring vehicle 3.

Sixth Modification

Acceleration may be used to calculate the pass-through time. An acceleration of the subject vehicle 2 is acquired in addition to the speed. The acceleration of the subject vehicle 2 is used to estimate a speed change in the subject vehicle 2 and determine the pass-through time for the subject vehicle 2 to pass through crossing point X. An acceleration of the neighboring vehicle 3 is acquired in addition to the speed. The acceleration of the neighboring vehicle 3 is used to estimate a speed change in the subject vehicle 2 and determine the pass-through time for the neighboring vehicle 3 to pass through crossing point X. This can more accurately calculate the pass-through time for the subject vehicle 2 and the neighboring vehicle 3.

Seventh Modification

The above-mentioned embodiments determine whether determination area B contains intersection node A for the nearest intersection of roads. It may be favorable to determine whether intersection node A is contained in not only the nearest intersection of roads, but also an intersection of roads the subject vehicle 2 passes through immediately after the nearest intersection of roads.

Eighth Modification

According to the above-mentioned embodiments, the subject vehicle 2 determines neighboring-vehicle estimated trajectory JN by using the current position and the absolute orientation transmitted by the neighboring vehicle 3. However, the neighboring vehicle 3 may successively calculate and transmit neighboring-vehicle estimated trajectory JN. In this case, neighboring-vehicle estimated trajectory JN transmitted by the neighboring vehicle 3 corresponds to the trajectory estimation information.

Ninth Modification

In the first embodiment, the order of the process at S11 and the determination at S10 may be reversed. The determination at S10 may be omitted.

Tenth Modification

The driving assistance system 100 included in the neighboring vehicle 3 just needs to transmit the neighboring vehicle information. Therefore, the driving assistance system 100 need not include the traveling road determination apparatus 50.

Eleventh Modification

At S1 according to the embodiment, the controller 13 performs the map matching by acquiring the road map information near the subject vehicle 2 from the traveling road determination apparatus 50 on condition that the road map information depends on the current position of the subject vehicle 2. However, the traveling road determination apparatus 50 may perform the map matching based on the current position of the subject vehicle 2 and specify a road traveled by the subject vehicle 2. In this case, the traveling road determination apparatus 50 specifies information indicating the road traveled by the subject vehicle 2. The controller 13 acquires this information from the traveling road determination apparatus 50.

Twelfth Modification

According to the third embodiment, the driving assistance system 100a mounted on neighboring vehicle NV transmits several sets of driving assistance information at a time. Similarly to the first or second embodiment, however, the driving assistance system 100a may transmit one set of neighboring vehicle information at a time. In this case, the driving assistance system 1a may generate travel track Tr by storing the neighboring vehicle information transmitted from each neighboring vehicle NV.

Thirteenth Modification

According to the first embodiment and the second and third modifications, subject-vehicle estimated trajectory JS and neighboring-vehicle estimated trajectory JN are shaped into a line, an arc, or travel track Tr for neighboring vehicle NV. However, subject-vehicle estimated trajectory JS and neighboring-vehicle estimated trajectory JN may be shaped differently from each other. For example, subject-vehicle estimated trajectory JS may be shaped into a line. Neighboring-vehicle estimated trajectory JN may be shaped into travel track Tr for neighboring vehicle NV.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A driving assistance apparatus to a vehicle, the driving assistance apparatus including a driving assistance section to perform control over assisting a driver in driving the vehicle, the driving assistance apparatus comprising:
   a subject vehicle position determination section that successively acquires a position determined by receiving a navigation signal transmitted from a navigation satellite included in a satellite navigation system and successively determines a current position of the vehicle, the vehicle being referred to as a subject vehicle;
   a subject vehicle estimation section that estimates a subject-vehicle estimated trajectory as a subsequent traveling trajectory of the subject vehicle from a current position of the subject vehicle determined by the subject vehicle position determination section and a traveling orientation of the subject vehicle;

a neighboring vehicle estimation section that estimates a neighboring-vehicle estimated trajectory as a subsequent traveling trajectory of a neighboring vehicle around the subject vehicle by acquiring trajectory estimation information to estimate a neighboring-vehicle estimated trajectory as a subsequent traveling trajectory of the neighboring vehicle via an inter-vehicle communication unit included in the subject vehicle, the trajectory estimation information including a traveling orientation of the neighboring vehicle and a current position of the neighboring vehicle determined based on the navigation signal;

an area designation section that designates a determination area so as to include a crossing point that is included in the subject-vehicle estimated trajectory and the neighboring-vehicle estimated trajectory; and a determination section that determines whether the determination area designated by the area designation section includes an intersection node in road map information that represents an intersection of roads as the intersection node, wherein the driving assistance section uses a first driving assistance level when the determination area does not include the intersection node, the first driving assistance level being smaller in driving assistance than a second driving assistance level used when the determination area includes the intersection node.

2. The driving assistance apparatus according to claim 1, wherein the subject vehicle estimation section assumes a current position of the subject vehicle determined by the subject vehicle position determination section to be a basing point and identifies the subject-vehicle estimated trajectory with a straight line extending from the basing point along a traveling orientation of the subject vehicle.

3. The driving assistance apparatus according to claim 1, further comprising an acquisition section that successively acquires a vehicle speed and a yaw rate of the subject vehicle, wherein the subject vehicle estimation section calculates a turning radius of the subject vehicle based on a vehicle speed and a yaw rate of the subject vehicle acquired by the acquisition section, identifies, as a basing point, a current position of the subject vehicle determined by the subject vehicle position determination section, and identifies, as the subject-vehicle estimated trajectory, an arc of the turning radius of the subject vehicle, the arc being in contact with a front-back direction line of the subject vehicle at the basing point.

4. The driving assistance apparatus according to claim 1 comprising a track information acquisition section that receives travel track information from the neighboring vehicle via the inter-vehicle communication unit, the travel track information being used to determine a determined travel track of the neighboring vehicle, wherein the subject vehicle estimation section includes:

a subject vehicle track determination section that determines, as a determined travel track to determine the subject-vehicle estimated trajectory, a specified travel track of the neighboring vehicle specified based on the travel track information, the specified travel track satisfying a condition of a distance from a current position of the subject vehicle and a condition of an angle difference from a traveling orientation of the subject vehicle; and a subject-vehicle estimated trajectory determination section that determines the subject-vehicle estimated trajectory based on part of the determined travel track determined by the subject vehicle track determination section, the part of the determined travel track extending in a traveling orientation of the subject vehicle from a start point that depends on a current position of the subject vehicle determined by the subject vehicle position determination section.

5. The driving assistance apparatus according to claim 1, wherein:

the trajectory estimation information received by the inter-vehicle communication unit includes a current position of the neighboring vehicle and a traveling orientation of the neighboring vehicle; and the neighboring vehicle estimation section identifies, as a basing point, a current position of the neighboring vehicle acquired via the inter-vehicle communication unit and identifies, as the neighboring-vehicle estimated trajectory, a straight line extending from the basing point in the traveling orientation of the neighboring vehicle.

6. The driving assistance apparatus according to claim 1, wherein:

the trajectory estimation information received by the inter-vehicle communication unit includes a current position, a vehicle speed, and a yaw rate of the neighboring vehicle; and the neighboring vehicle estimation section calculates a turning radius of the neighboring vehicle based on a vehicle speed and a yaw rate of the neighboring vehicle acquired via the inter-vehicle communication unit, identifies, as a basing point, a current position of the neighboring vehicle acquired via the inter-vehicle communication unit, and identifies, as the neighboring-vehicle estimated trajectory, an arc of the turning radius of the neighboring vehicle, the arc being in contact with a front-back direction line of the neighboring vehicle at the basing point.

7. The driving assistance apparatus according to claim 1, further comprising:

a trajectory estimation information acquisition section that acquires, as the trajectory estimation information, travel track information from the neighboring vehicle via the inter-vehicle communication unit, the travel track information being used to determine a determined travel track of the neighboring vehicle including a each of a first neighboring vehicle and a second neighboring vehicle, wherein the neighboring vehicle estimation section includes:

a neighboring vehicle track determination section that determines, as a determined travel track to determine a neighboring-vehicle estimated trajectory of the second neighboring vehicle, a specified travel track of the first neighboring vehicle specified based on the travel track information assumed to be transmitted from the first neighboring vehicle, the specified travel track of the first neighboring vehicle satisfying a condition of a distance from a current position of the second neighboring vehicle and a condition of an angle difference from a traveling orientation of the second neighboring vehicle; and a neighboring-vehicle estimated trajectory determination section that determines the neighboring-vehicle estimated trajectory of the second neighboring vehicle based on part of the determined travel track determined by the neighboring vehicle track determination section to determine the neighboring-vehicle estimated trajectory of the second neighboring vehicle, the part of the determined travel track extending in a traveling orientation of the second neighboring vehicle from a start point that depends on a current position of the second neighboring vehicle.

8. The driving assistance apparatus according to claim 1, wherein the area designation section acquires a traveled road width-related value related to a road width of a road traveled by the subject vehicle, and increases the determination area in a direction from the subject vehicle to the center of a width direction of a road traveled by the subject vehicle depending on a road width determined based on the traveled road width-related value.

9. The driving assistance apparatus according to claim 8, wherein the area designation section acquires a specified number of lanes of a road traveled by the subject vehicle as the traveled road width-related value.

10. The driving assistance apparatus according to claim 8, wherein:

the determination section determines whether the determination area includes the intersection node corresponding to a nearest intersection of roads on a road traveled by the subject vehicle; and the area designation section acquires an intersecting road width-related value as a value related to a road width of an intersecting road intersecting at a nearest intersection of roads on a road traveled by the subject vehicle and increases the determination area in accordance with a road width settled based on the intersecting road width-related value in a direction along the subject-vehicle estimated trajectory, the direction being settled depending on whether the neighboring vehicle exists at a right side or a left side of the subject-vehicle estimated trajectory viewed from the subject vehicle.

11. The driving assistance apparatus according to claim 1, wherein the determination section determines whether the determination area includes the intersection node corresponding to a nearest intersection of roads on a road traveled by the subject vehicle.

* * * * *